MULTIPLE REGISTER MECHANISM FOR CALCULATING MACHINES

Filed Nov. 26, 1951

16 Sheets-Sheet 1

INVENTORS
THOMAS M. BUTLER
BYRON A. RUNDE
BY Fidler, Crouse
+ Beardsley.
ATTORNEYS

MULTIPLE REGISTER MECHANISM FOR CALCULATING MACHINES

Filed Nov. 26, 1951

INVENTORS
THOMAS M. BUTLER
BY BYRON A. RUNDE
Fidler, Crouse + Beardsley
ATTORNEYS

MULTIPLE REGISTER MECHANISM FOR CALCULATING MACHINES

INVENTORS
THOMAS M. BUTLER
BYRON A. RUNDE
BY Fidler, Crouse + Beardsley.
ATTORNEYS

MULTIPLE REGISTER MECHANISM FOR CALCULATING MACHINES

Filed Nov. 26, 1951

INVENTORS
THOMAS M. BUTLER
BYRON A. RUNDE
BY Fidler, Crome + Beardsley
ATTORNEYS Oct. 25, 1955 T. M. BUTLER ET AL 2,721,695

MULTIPLE REGISTER MECHANISM FOR CALCULATING MACHINES

Filed Nov. 26, 1951 16 Sheets-Sheet 5

INVENTORS
THOMAS M. BUTLER
BY BYRON A. RUNDE
Fidler, Crouse + Beardsley.
ATTORNEYS Oct. 25, 1955 T. M. BUTLER ET AL 2,721,695

MULTIPLE REGISTER MECHANISM FOR CALCULATING MACHINES

Filed Nov. 26, 1951 16 Sheets-Sheet 6

INVENTORS
THOMAS M. BUTLER
BY BYRON A. RUNDE
Fidler, Crouse & Beardsley
ATTORNEYS

MULTIPLE REGISTER MECHANISM FOR CALCULATING MACHINES

Filed Nov. 26, 1951 16 Sheets-Sheet 7

INVENTORS
THOMAS M. BUTLER
BY BYRON A. RUNDE
Fidler, Crouse + Beardsley
ATTORNEYS INVENTORS
THOMAS M. BUTLER
BY BYRON A. RUNDE
Fidler, Crouse + Beardsley.
ATTORNEYS

MULTIPLE REGISTER MECHANISM FOR CALCULATING MACHINES

Filed Nov. 26, 1951 16 Sheets-Sheet 9

INVENTORS
THOMAS M. BUTLER
BYRON A. RUNDE
BY Fidler, Crome + Beardsley
ATTORNEYS Oct. 25, 1955 T. M. BUTLER ET AL 2,721,695

MULTIPLE REGISTER MECHANISM FOR CALCULATING MACHINES

Filed Nov. 26, 1951 16 Sheets-Sheet 10

INVENTORS
THOMAS M. BUTLER
BY BYRON A. RUNDE
Fidler, Crouse & Beardsley
ATTORNEYS Oct. 25, 1955 T. M. BUTLER ET AL 2,721,695

MULTIPLE REGISTER MECHANISM FOR CALCULATING MACHINES

Filed Nov. 26, 1951 16 Sheets-Sheet 11

INVENTORS
THOMAS M. BUTLER
BY BYRON A. RUNDE
Fidler, Crouse + Beardsley
ATTORNEYS Oct. 25, 1955 T. M. BUTLER ET AL 2,721,695

MULTIPLE REGISTER MECHANISM FOR CALCULATING MACHINES

Filed Nov. 26, 1951 16 Sheets-Sheet 12

INVENTORS
THOMAS M. BUTLER
BY BYRON A. RUNDE
Fidler, Crouse + Beardsley
ATTORNEYS Oct. 25, 1955 T. M. BUTLER ET AL 2,721,695

MULTIPLE REGISTER MECHANISM FOR CALCULATING MACHINES

Filed Nov. 26, 1951 16 Sheets-Sheet 13

INVENTORS
THOMAS M. BUTLER
BY BYRON A. RUNDE
Fidler, Crome + Beardsley
ATTORNEYS INVENTORS
THOMAS M. BUTLER
BY BYRON A. RUNDE
Fidler, Crown + Beardsley
ATTORNEYS INVENTORS
THOMAS M. BUTLER
BY BYRON A. RUNDE
Fidler, Crane + Beardsley
ATTORNEYS

MULTIPLE REGISTER MECHANISM FOR CALCULATING MACHINES

Filed Nov. 26, 1951 16 Sheets-Sheet 16

INVENTORS
THOMAS M. BUTLER
BYRON A. RUNDE
BY Fidler, Crouse + Beardsley
ATTORNEYS 2,721,695

MULTIPLE REGISTER MECHANISM FOR CALCULATING MACHINES

Thomas M. Butler, Detroit, and Byron A. Runde, Farmington, Mich., assignors to Burroughs Corporation, Detroit, Mich., a corporation of Michigan Application November 26, 1951, Serial No. 258,134

11 Claims. (Cl. 235—60.48)

This invention relates to improvements in multiple register mechanism for calculating machines such, for example, as are employed for accounting and bookkeeping.

When accounting and bookkeeping machines are provided, in addition to a main register or so-called "cross-footer," with a plurality of further registers to be employed, for example, to accumulate totals of different classes of amounts throughout a posting run, it is generally preferred, for reasons of economy of machine size and cost, to provide such further registers in an interspersed pinion type of multiple register structure, that is a structure of the kind in which the pinions of a group of such further registers are mounted on a common supporting shaft with the pinions of successive numerical orders of each register interspersed between the pinions of the other registers of the group so that all of the pinions on the common shaft are arranged in a number of compact groups equal to the number of numerical orders and each containing the pinions of a single numerical order of all the registers of the group. The center to center spacing of adjacent groups of pinions of the multilpe register unit is the same as the spacing of the differential actuators by which amounts are entered into or withdrawn from the registers and any register in the group may be brought into position for cooperation with said actuators and with a single tens-transfer mechanism for the group by a longitudinal movement of the pinion shaft of an extent less than such spacing.

As contrasted with the employment of a plurality of separate single register structures, the use of a multiple register unit, such as above outlined, requires that a substantial amount of time be allowed in the initial portion of each cycle of operation of the machine for cross-sliding of the multiple register pinions and their common supporting shaft to align the pinions of a selected register with the differential actuators before the latter are moved from their normal "O" positions to roll the pinions of the selected register back to their "O" positions in taking a total from the selected register. As that necessity cannot be avoided in total-taking operations, it is advatnageous to perform subtraction also by having the pinions in mesh with the differential actuators while the latter are moving away from their "O" positions instead of during the return of the differential actuators to "O" as in adding operations. It is apparent that any increase or decrease in the amount of time required for such register-selecting movement of the multiple register pinion support, and for operation of the mechanism by which it is accomplished, usually requires an equal increase or permits an equal decrease in the time allowed for the complete cycle of operation of the machine so that the cycling speed and productivity of the machine are directly affected.

An object of the present invention is to provide an improved register selecting means for multiple registers of the interspersed pinion type which is operable with improved reliability and rapidity in a short initial portion of the cycle of operation of the calculating machine.

A further object is the provision of improved register selecting means of the above-stated kind which is governed by the traveling paper carriage of the calculating machine by a sensing type of control operated by the machine during a cycle of machine operation rather than by the paper carriage during movement of the latter.

A further object of the invention is the provision of improved register selecting means of the above-stated kind controllable during a cycle of machine operation to select registers in accordance with the setting of manually pre-settable means.

A further object is the provision of improved register selecting means of the above-stated kind in which control by the manually pre-settable means predominates over control by the carriage-governed means.

Further objects and advantages of the invention will become apparent from the following description and the accompanying drawings in which.

Figures 17, 18, 19:
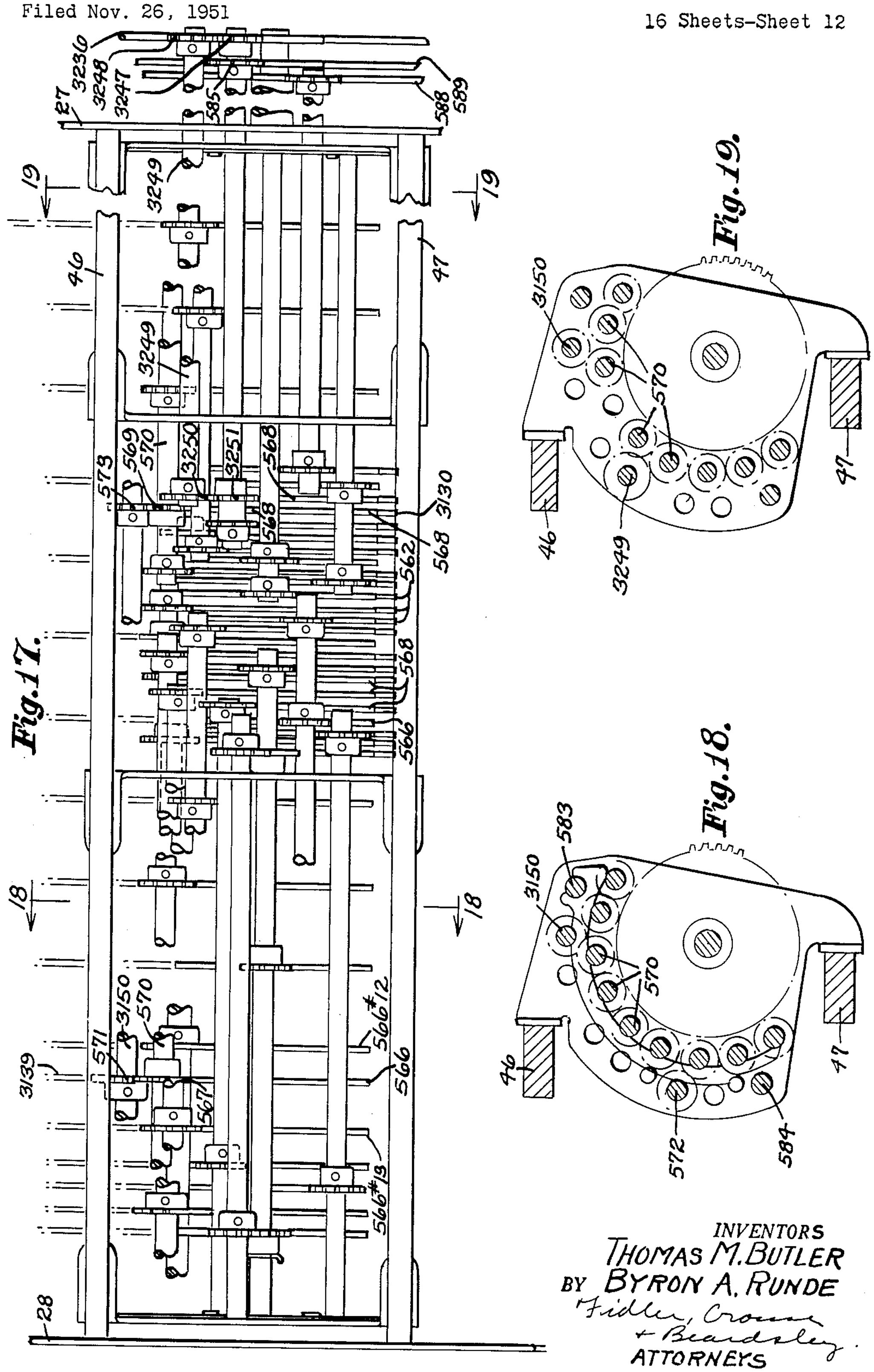
Fig. 17 is a bottom plan view of a gear assembly through which the type bars are indexed from the differential actuator mechanism.
Figure 20:
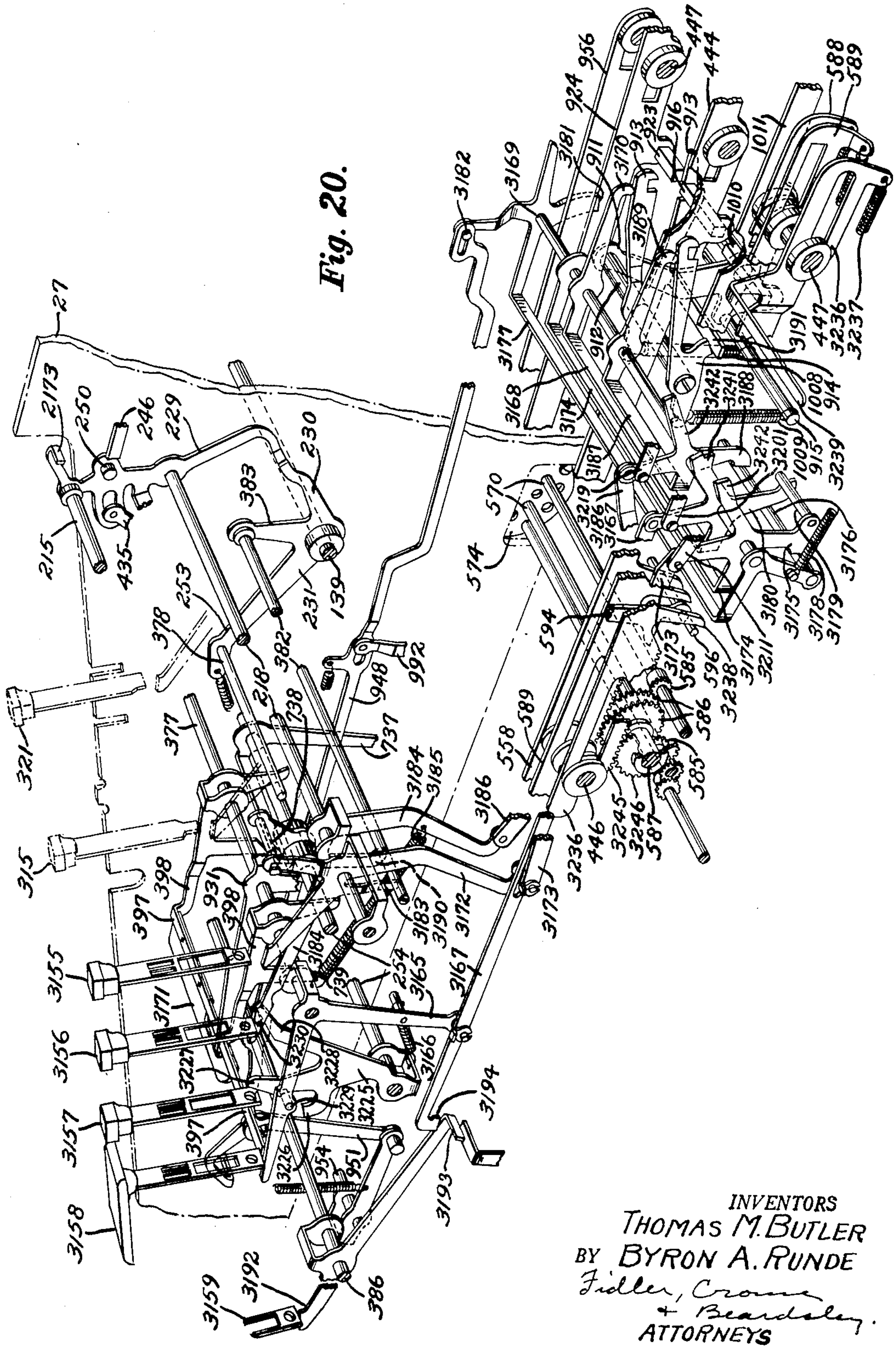
Figure 21:
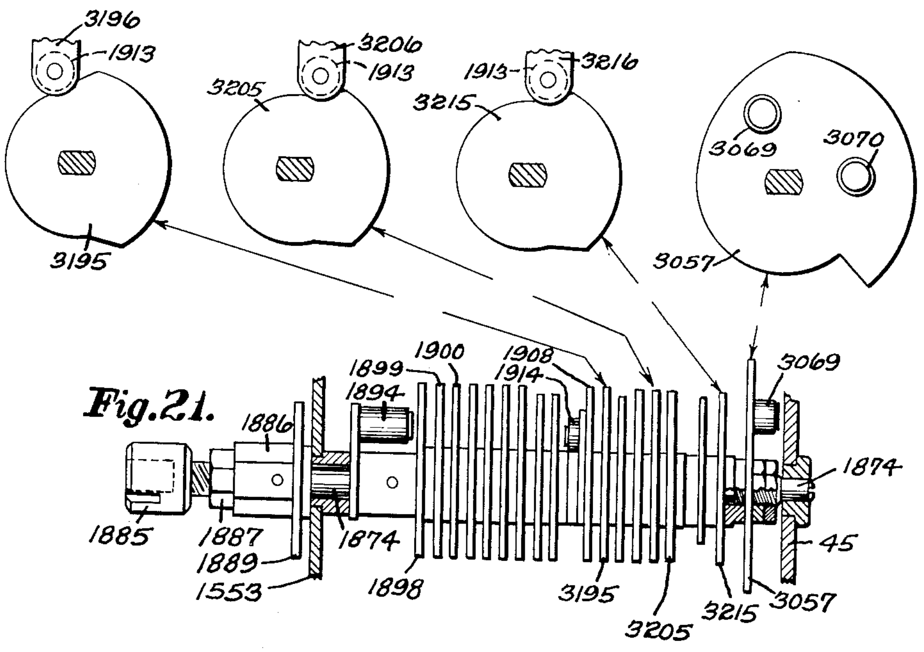
Figure 22:
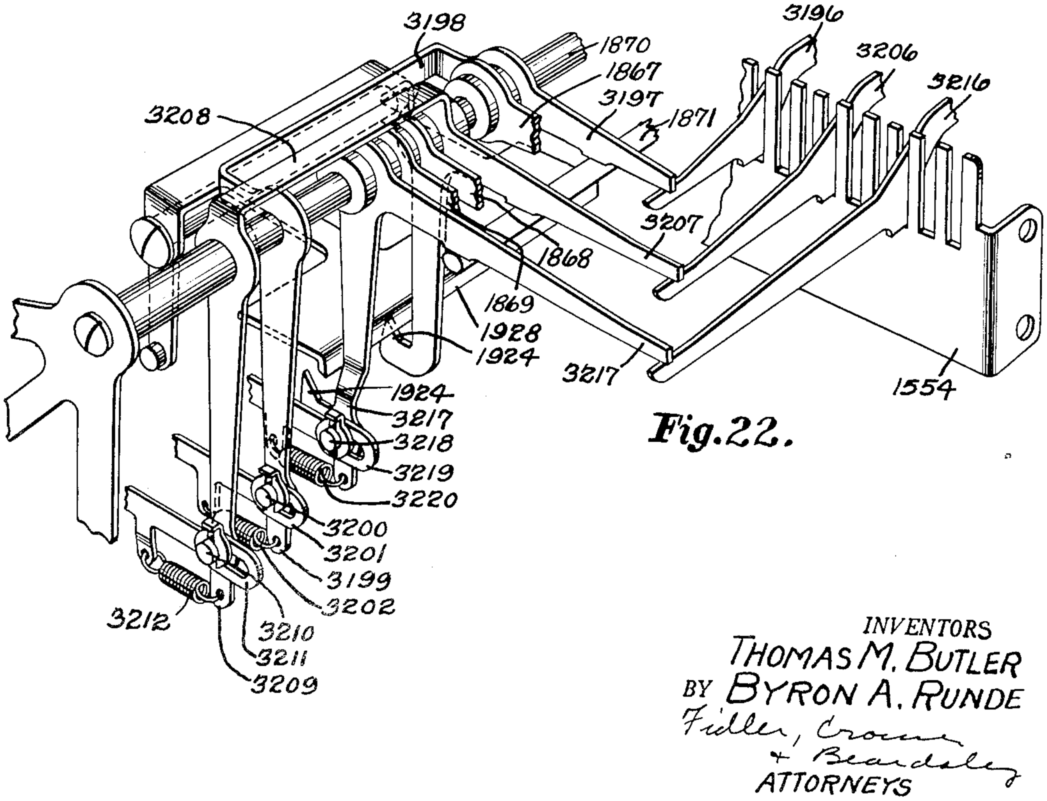
Figure 23:
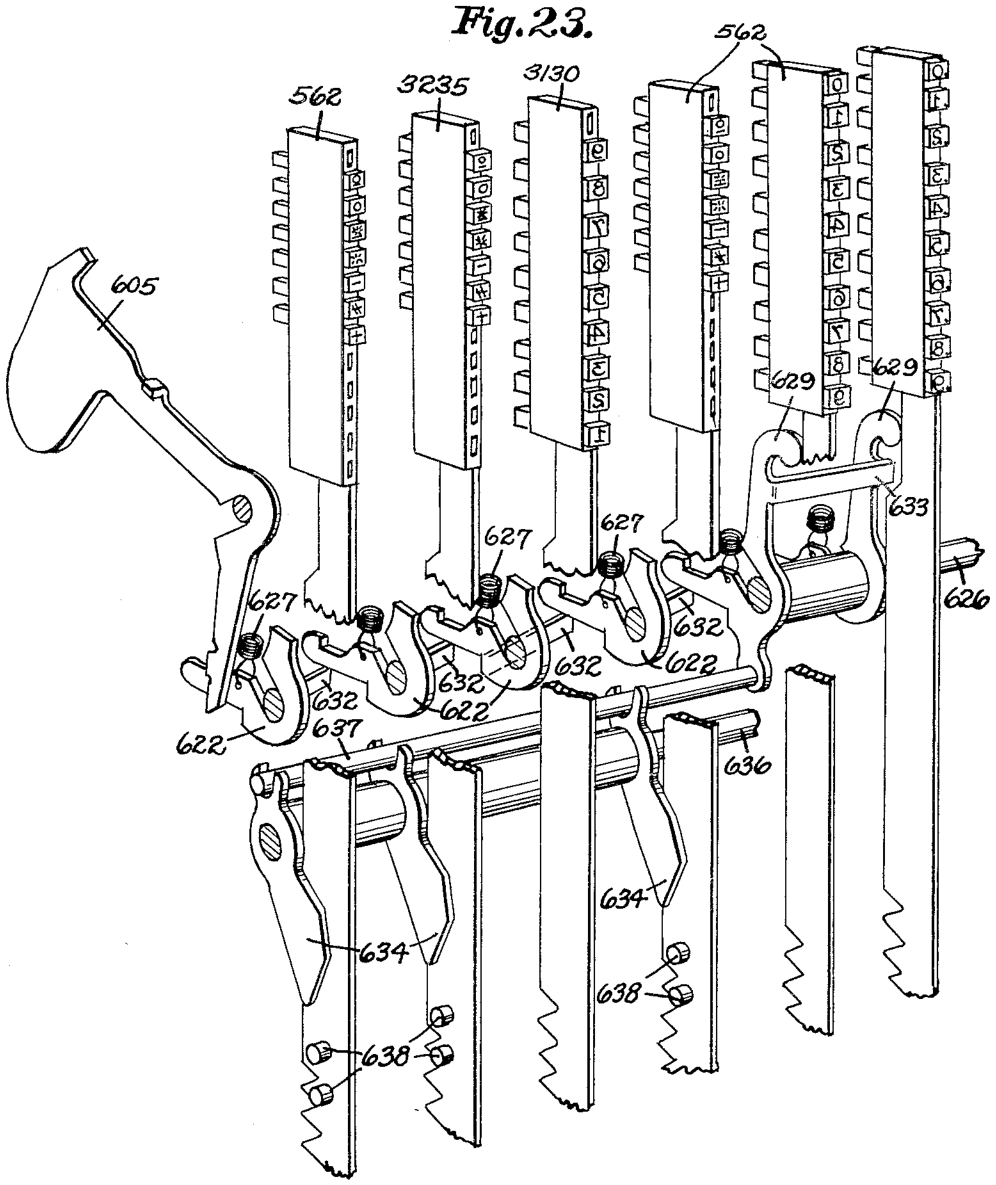
Figure 24:
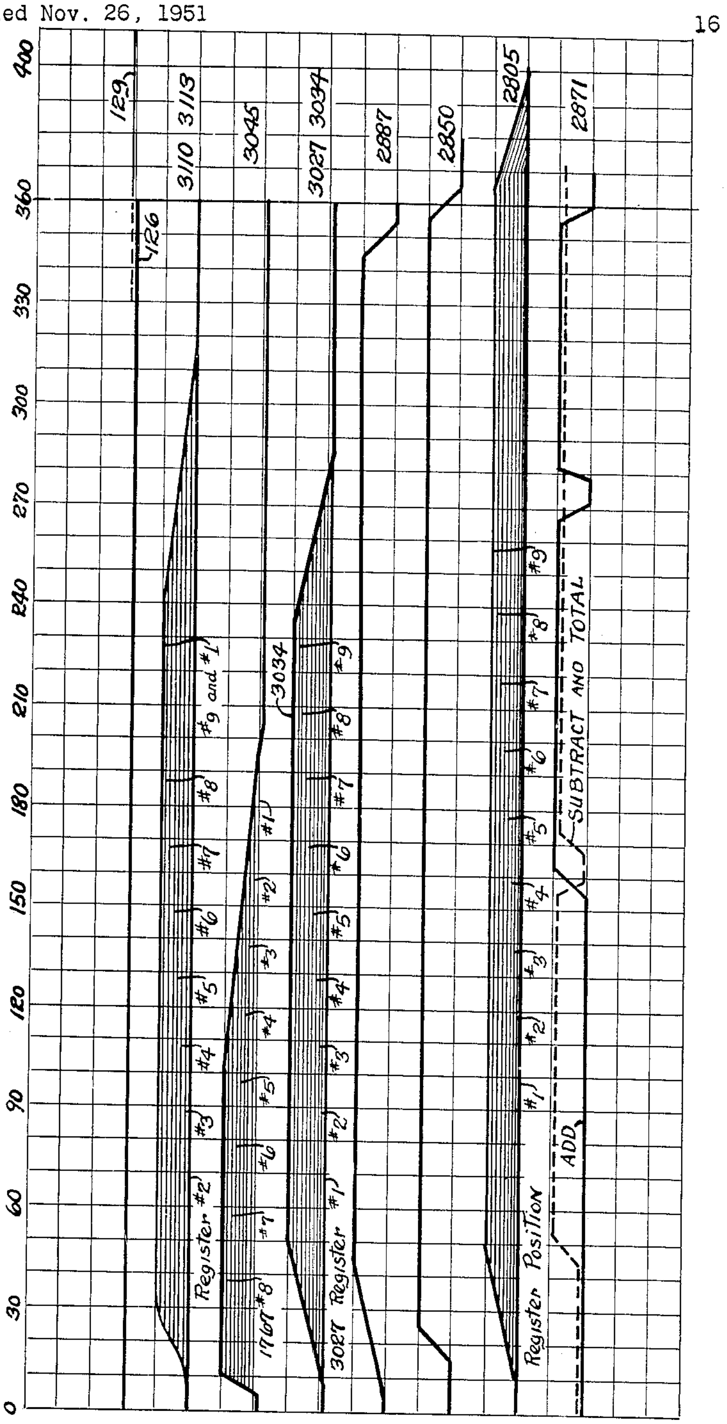

Figs. 18 and 19 are sections on the lines 18—18 and 19—19 of Fig. 17;

Fig. 20 is a perspective of the register function control keys and mechanism controlled by those keys as viewed from the upper right rear corner;

Fig. 21 is a right side elevation of the automatic control operating cam assembly;

Fig. 22 is a perspective portions of the automatic register function control mechanism as viewed from the upper right rear corner;

Fig. 23 is a perspective of the upper portions of portions of the dimes, pennies, and crossfooter and register function symbol and register identification type bars and some of the associated printing control elements; and Fig. 24 is a chart showing the timing of certain elements of the machine identified by the reference numbers applied to the graph lines in Fig. 24.

The invention is shown in the accompanying drawings and described hereinafter as embodied in a Burroughs series F accounting machine which, except as herein particularly described and shown, is in all essentials like that fully disclosed in application of Thomas M. Butler, Serial No. 174,696, filed July 19, 1950, now Patent No. 2,629,549. One such exception is that the machine disclosed herein has, in addition to the two algebraic totalizers or crossfooters disclosed in the Butler application, also a set of multiple registers. An application of Byron A. Runde, Serial No. 242,623, filed August 20, 1951, discloses a calculating machine of the kind disclosed in the Butler application with a single crossfooter in the position of the front crossfooter of the Butler application and with a multiple register unit located in the position of the rear crossfooter of the Butler application. The machine of the present application has both of the crossfooters of the machine of the Butler application located in the same positions as shown in the Butler application and, additionally, a multiple register unit located rearwardly of the rear crossfooter. The multiple register unit of the machine disclosed in the present application is essentially the same as the multiple register unit disclosed in the Runde application except for the difference in location, except also that it contains nine registers whereas the multiple register unit shown in the Runde application contains four, and except for such changes in numbers and dimensions of parts as are required by the increase in number of registers. Nevertheless, to facilitate a clear understanding of the present invention, the multiple register unit of the herein disclosed machine will be described in detail hereinafter.

Elements which are disclosed in the Butler application or in the Runde application and referred to hereinafter are designated by the same reference numbers as in said Butler applications or Runde application. Reference numbers of elements of the prior machines which are referred to hereinafter but not shown in the annexed drawings are enclosed in parentheses. Reference numbers below 2600 designate elements disclosed in the Butler application, and reference numbers between 2800 and 3000 designate elements first disclosed in the Runde application. Elements which are now added to the prior machines or substituted for elements formerly therein are designated by reference numbers above 3000.

Consistently with the description in said Butler application, the terms clockwise and counterclockwise will be employed to describe rotary or swinging movements of the parts as viewed from above, in front, or from the right side of the machine and the terms rightward, leftward, forward, rearward, upward, downward will be employed to describe motions and positions of the parts as viewed normally from in front of the machine. Also consistently with the description in the Butler application, timing of movements and actions of various elements of the machine is described with reference to degrees of a cycle of operation which is synonymous with degrees of rotation of the main cycling cam shaft 126 of the machine. In the present description, it will also be necessary to refer to the timing of movements and actions of elements occurring after the 360° point, that is, after the main shaft 126 has come to rest upon completing a full revolution. The clearest and most convenient manner of describing such timing is with reference to further rotation of the portion of the machine cycling clutch, specifically the toothed clutch disk 129 of the Butler application, which rotates at all times while the machine drive motor runs. Accordingly, when an action or movement is referred to hereinafter as starting at 363°, it should be understood that such action or movement starts when said clutch disk 129 has moved 3° beyond the point (360°) at which the clutch pawl 134 carried on an arm secured on the main shaft 126, is disconnected from said disk 129. In Fig. 24 the timing beyond the 360° point of the machine cycle is based upon continuing rotation of the toothed clutch disk 129 after rotation of the main cycling cam shaft 126 is stopped. As disclosed in the Butler application, the machine cycling clutch is invariably disengaged at the end of each machine cycle even though it may be re-engaged almost immediately as when a motor bar is manually retained in depressed position or an automatic machine cycle is caused by the carriage governed automatic controls. In any event, the clutch pawl 134, having been disengaged from the toothed clutch disk, cannot re-engage the toothed disk to start a further revolution of the machine cycling shaft 126 until the toothed clutch disk 129 has rotated one tooth-space further. As the disk 129 has ten teeth, the minimum pause of the machine cycling shaft 126 corresponds to 36 degrees of rotation of the toothed clutch disk. Accordingly, even though the return to normal of some element of the machine occurred only a little before the 396° point, i. e., nearly 36° after the machine cycle, no additonal provision would be required to insure that a further machine cycle could not be initiated prior to the return to normal of such element. That consideration will be of importance in connection with the return to normal of parts of the hereinafter described multiple register mechanism following operations of certain ones of the registers.

In the machine herein disclosed, the multiple register unit is mounted in the machine frame rearwardly of the rear crossfooter and rearwardly also of the lower portions of the type bars 562. The construction and operation of the multiple register unit, like that in the Runde application, is extensively similar to the construction and operation of the crossfooter unit illustrated and described in detail in the Butler application. The multiple register unit may, therefore, be concisely described as being like such crossfooter unit except as hereinafter particularly pointed out.

Figures 3, 4:
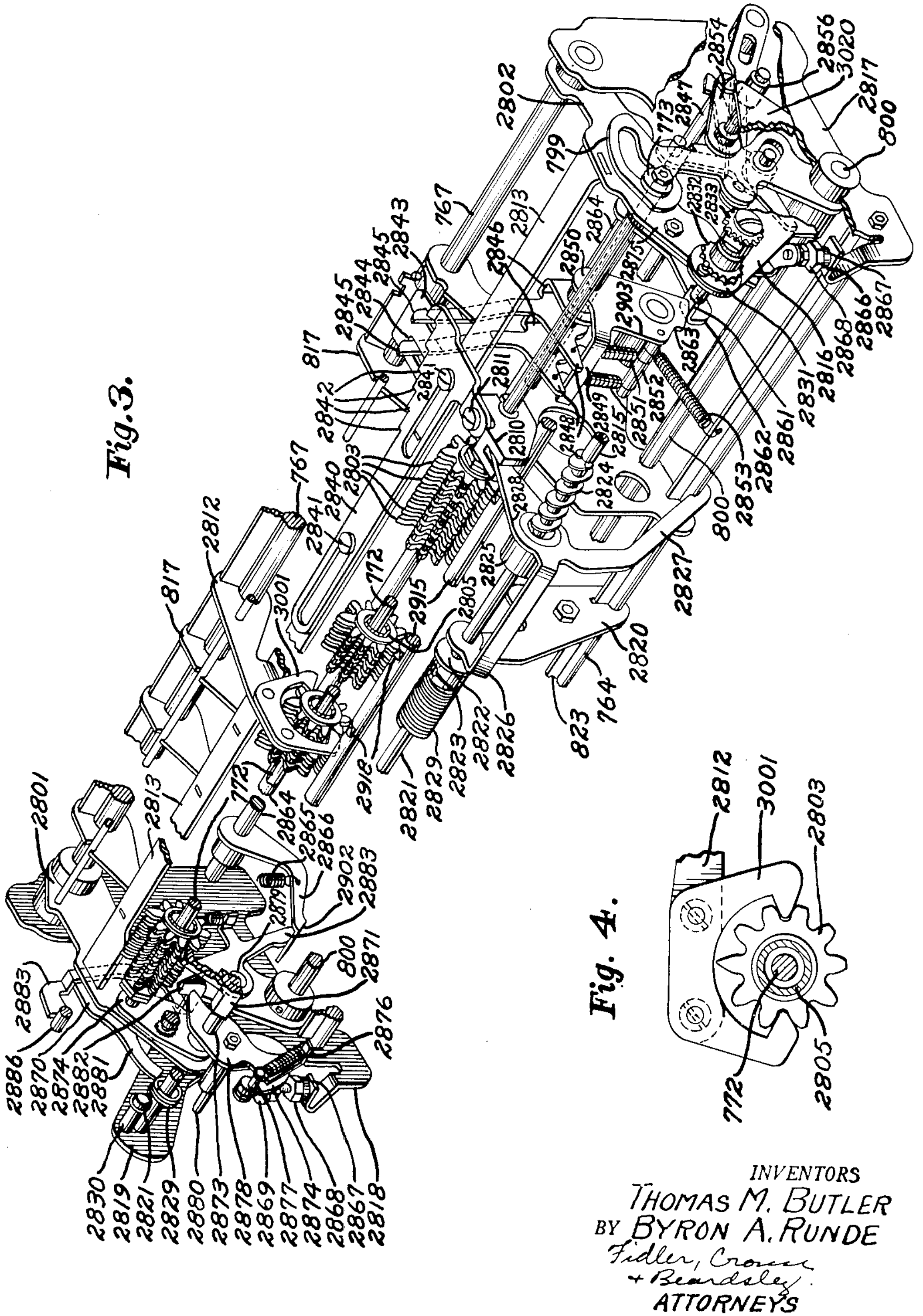
Fig. 3 is a perspective of the multiple register unit as viewed from the upper left rear corner and with portions omitted and broken away for clarity.
Fig. 4 is a detail view of a portion of the mechanism shown in Fig. 3.
Figure 5:
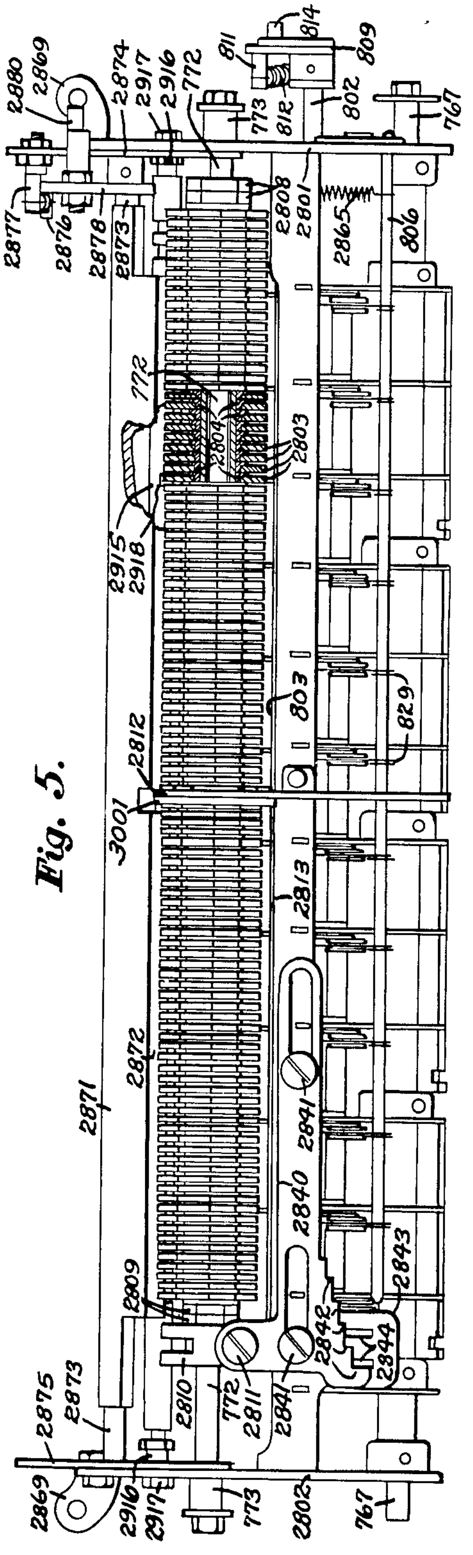
Fig. 5 is a top plan of the multiple register pinion frame.

The pivoted pinion-supporting frame of the multiple register unit (Figs. 3 and 5) has a single pinion supporting shaft 772, the second pinion supporting shaft 771 or 771' and the negative total pinions 774 or 774' of the crossfooters together with elements (770, 782, 816 and 880—884) which cooperate with the negative total pinions of the crossfooters being omitted from the present multiple register unit. The multiple register pinion shaft 772 is supported between and secured to the pinion frame right and left end plates 2801 and 2802 in the same manner as the shaft 772 of the Butler crossfooter is secured to and supported between the pinion frame end plates (766). The pinions 2803 of the nine registers of the illustrated multiple register unit are like the crossfooter pinions except that they are substantially thinner than the latter. Each pinion 2803 is rotatably mounted on the reduced portion of a short shouldered sleeve 2804 (Figs. 3 and 5) which is like the sleeves (776) of the crossfooter except that it is shorter. The sleeves 2804 are mounted on a tube 2805 which, like the tube (777) in the crossfooter, has its end portions slidably fitting the shaft 772 and has a somewhat larger internal diameter intermediate its ends to prevent binding by slight flexing of the tube. The pinions 2803 and their sleeves 2804 are arranged in compact groups, each group containing the pinions and sleeves for a single order of all the registers, the nine sleeves 2804 of each group having a total length equal to the spacing between centers of the actuator racks 511 and all the pinions 2803 being equally spaced along the shaft 772. A pair of nuts 2808 is threaded on the right end of the tube 2805 against the right sleeve 2804. Another pair of nuts 2809 is threaded on the tube 2805 a short distance inwardly from its left end whereby all the sleeves 2804 and 2806 may be securely clamped in their proper positions on the tube 2805. A member 2810 has a bore threaded to receive the left end of the tube 2805, is formed with a slot extending radially from its bore through the side of the member, and is contracted upon the tube 2805 by means of a headed screw 2811. In the multiple register pinion frame, between two of the interior spacing plates 817 near the middle of the unit, a plate 2812 is mounted on the shaft 767 in the same manner as the plates 817 and is secured to the upper side of a strip 2813 which is substituted for a somewhat similar strip (769) of the crossfooter. A guide and brace plate 3001, secured as by headed screws to the right side of the rear end of the plate 2812, has two arms 3002 extending downwardly, one in front of and one behind the line of pinions 2803 and terminating in bluntly pointed ends or teeth directed toward the shaft 772 and positioned to engage in diametrically opposite tooth spaces of whichever one of the pinions 2803 happens to be aligned with said plate 3001. The plates 2812 and 3001 serve to brace the shaft 772 and pinion assembly thereon against bending more than to a very slight extent as the pinions are driven by the actuator racks 511 and 519, and they also serve to keep the teeth of the pinion 2803 engaged with the teeth of the plate 3001 in alignment with the teeth of those of the remaining pinions 2803 not being rotated by the actuator racks 511 and 519 or transfer segments 850.

Figure 6:
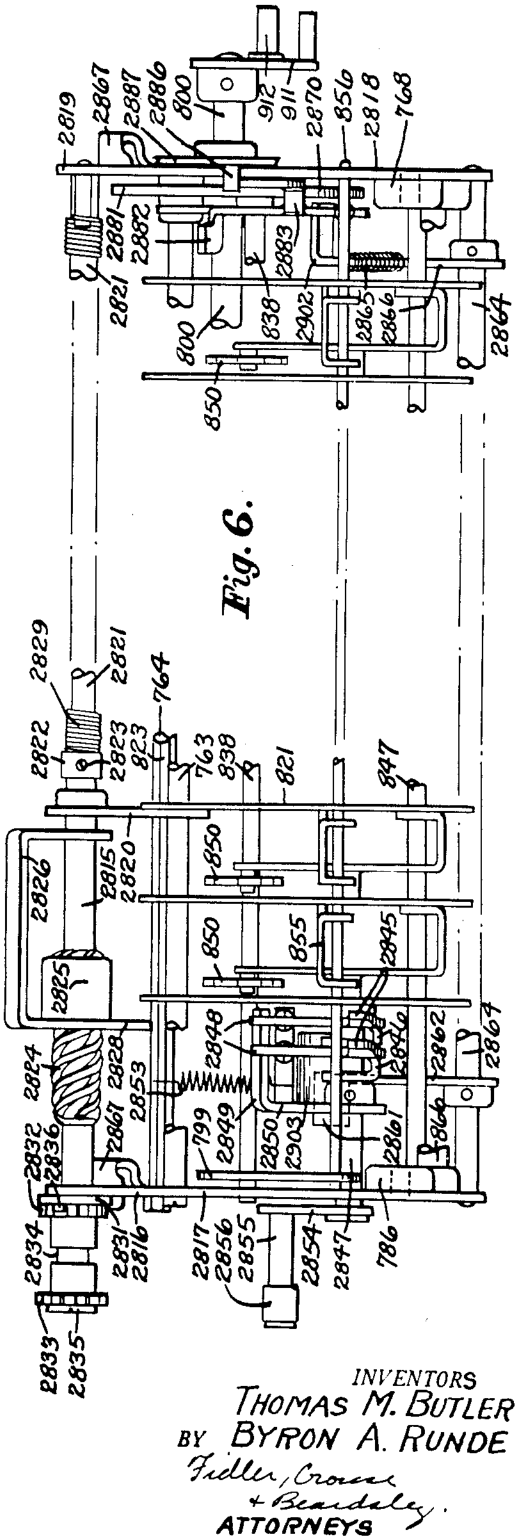
Fig. 6 is a partial top plan of the main frame, including the tens-transfer mechanism of the multiple register unit.

A shaft 2815 (Figs. 3 and 6) is rotatably supported near its left end in an upwardly and rearwardly extending arm 2816 of the left side plate 2817 of the multiple register unit main frame, and near its right end in a bushing in a similar arm of a plate 2820 supported on the rods 763 and 764 and secured to the left face of the third partition plate 821 inwardly from the left end of the register unit as by a screw and nut. A similar arm 2819 on the right side plate 2818 of the register unit main frame is apertured to receive the reduced right end of a rod 2821. The reduced left end of the rod 2821 and the reduced right end of the shaft 2815 are received in opposite ends of the bore in a short sleeve 2822 which is secured to the shaft 2815 as by means of a set screw 2823. Intermediate its ends, the shaft 2815 has a portion 2824 of enlarged diameter formed with a right hand helical multiple thread. A collar 2825 threaded internally to fit the threaded portion 2824 of the shaft 2815 is secured in the left side portion of a yoke member 2826, the right side portion of which is apertured for guidance on the shaft 2815. An arm 2827 extending downwardly from the left side of the yoke member 2826 has a hook-like lower end portion engaging the lower half of the circumference of the rod 764 for guidance thereon. The end of a finger 2828 extending forwardly from the left side of the yoke member 2826 is received in a rearwardly open vertical slot in the upper rear portion of the member 2810. It will be apparent that rotation of the shaft 2815 will move the yoke member 2826 lengthwise of the shaft 2815 and that the finger 2828 and member 2810 will shift the tube 2805 and the pinions 2803 correspondingly along the shaft 772.

The shaft 2815 is yieldingly urged clockwise by a long coiled spring 2829 loosely surrounding the rod 2821. The right end portion of the sleeve 2822 has an external diameter somewhat greater than the internal diameter of the spring 2829, is formed with a thread having the same pitch as the spring, and is inserted into the left end of the latter. The right end of the spring 2829 is hooked on a stud 2830 secured in the arm 2819. Before the set-screw 2823 is tightened to secure the sleeve 2822 to the right end of the shaft 2815, the sleeve is rotated counterclockwise to pre-tension the spring sufficiently to insure rapid and complete return of the register pinion assembly to its rightmost position whenever it is released for such return, as will be described hereinafter.

The left end of the shaft 2815 extends a short distance leftward of the left end plate 2817 and, immediately at the left side of the plate 2817, has a disk-like flange 2831 thereon. Two pinions 2832 and 2833 are formed on opposite ends of a common hub 2834 which passes through the left side frame plate 28 of the machine and is retained on the left end of the shaft 2815 and in engagement with the flange 2831 by a headed screw 2835 threaded into the end of the shaft. A stud 2836 projecting from the left face of the flange 2831 is adapted to be engaged between any two adjacent teeth of the pinion 2832. The pinion 2833 meshes with a rack 3003 on a slide 3004 (Fig. 1) forwardly and rearwardly slidably mounted leftwardly of the left side plate 28 of the machine frame on grooved studs 2838 secured in the plate 28. Accurate full meshing alignment of the rack 3003 and pinion 2833 is maintained by a bracket 2939 having a portion secured flat against the left face of the plate 28 by headed screws and formed with an upwardly opening slot, the lateral edges of which engage in a groove in the hub of the pinions 2832 and 2833. The bracket 2939 also has a portion disposed vertically and at a right angle to the plate 28 and formed with an upwardly open slot with a narrow upper portion, the edges of which have sliding engagement with the side surfaces of the rack slide 3004 above the line of the rack teeth thereon. The pinion 2832 has one less tooth than the pinion 2833, so that, after loosening the screws mounting the bracket 2839, and loosening the screw 2835 and then adjusting the pinion 2832 one or more tooth spaces relative to the stud 2836 while simultaneously slipping the pinion an equal number of tooth spaces relative to the rack 3003, a fine adjustment of the shaft 2815 relative to the rack 3003 is obtainable. In the illustrated example, with fourteen teeth on the pinion 2832 and fifteen teeth on the pinion 2833, the shaft may be adjusted rotatively relative to the rack 3003 by increments equivalent to about .004 inch of longitudinal movement of the rack 3003.

The means, to be described in detail hereinafter, to move the rack slide 3004 from its normal rearward #1 register selecting position to its eight forward register selecting positions and shift the register pinion assembly leftward from its normal #1 register positions to selected ones of its #2 to #9 register positions operates very early in the machine cycle. A slide 2840 (Figs. 3 and 5) has at its left end a rearwardly extending ear secured to the member 2810 by the screw 2811. The slide 2840 is guided on the upper face of the strip 2813 by two headed screws 2841 passing through rightwardly and leftwardly elongated slots in the slide and threaded into the strip 2813. The forward edge portion of the left end of the slide 2840 is formed with a series of shoulders 2842 which, considered serially from right to left, extend progressively farther forward, adjacent shoulders being spaced apart laterally twice the distance between adjacent register pinions 2803 of any one order. Beneath the left portion of the series of steps 2842, the strip 2813 has a forwardly extending portion 2843 formed with two forwardly and rearwardly extending parallel slots 2844 which are spaced apart laterally between centers one and one half times the spacing of adjacent shoulders 2842. Two detent arms 2845 (Figs. 3 and 6) extend upwardly through the respective slots 2844 from respective ones of two yoke members 2846 rockable on a shaft 2847 which is rotatably supported in the plate 2817 and in the leftmost plate 821. Each of the yoke members 2846 has a second arm 2848 extending rearwardly over a rightwardly turned lug 2849 on a rearward arm of a plate 2850 fixed on a hub secured to the shaft 2847. Tension springs 2851 connected between the arms 2848 and a stud 2852 secured in the lower rear portion of the plate 2850 normally hold the arms 2848 against the lug 2849 and a tension spring 2853 connected between the stud 2852 and the strip 823 normally holds the plate 2850 and the yoke members 2846 in a counterclockwise position where the arms 2845 are forwardly clear of all except the leftmost one of the steps 2842 and limit in the forward ends of the slots 2844. The coiled spring 2829 normally holds the register pinion assembly at the rightward limit of its movement, determined by means described hereinafter, where the leftmost one of the shoulders 2842 is very close to but not bearing on the leftward one of the arms 2845 and where the pinions 2803 of the leftmost one of the registers, the #1 register, is aligned with the actuator racks 511. The registers successively rightward of the #1, normally active register are numbered, consecutively, from #2 to #9, for convenient reference hereinafter.

A crank arm 2854 is secured to the left end of the shaft 2847 leftwardly of the plate 2817 and carries a crank pin 2855 which extends through the plate 28 and carries a small roller 2856 on its left end. Very early in each machine cycle, and as will be explained in detail hereinafter, the roller 2856 is depressed by a cam 3020 to rock the crank arm 2854, shaft 2847 and plate 2850 clockwise sufficiently to permit a leftwardly turned lug 2861 (Fig. 3) on the rear end of a lever 2862 to move up behind a latch shoulder 2863 on the lower edge of the plate 2850. The lever 2862 is secured at its rear end on a shaft 2864 rotatably supported at its ends in the plates 2817 and 2818 and urged counterclockwise by a tension spring 2865 connected between the rightward end of the rod 856 and an arm 2866 fixed to and extending rearwardly from a hub secured on the shaft 2864 near the plate 2818. As the plate 2850 is rocked clockwise, the springs 2851 cause the arms 2848 to follow the lug 2849 until the arms 2845 bear against the stepped forward edge of the slide 2840. As the register pinion assembly is shifted leftwardly on its shaft 772 by forward movement of the rack 3003, the arms 2845 alternately rock rearwardly at the right of the shoulders 2842 which are shifted leftwardly past them. If the right and left arms 2845 are designated R and L respectively and the shoulders 2842 are numbered from 1 to 6 from left to right, the arms 2845 will move into latching position with respect to the shoulders 2842 in the sequence L1 (normal), R3, L2, R4, L3, R5, L4, R6, L5. One or the other of the arms 2845 will then retain the register pinion assembly in a position with the pinions of the selected register aligned with the actuator racks 511 until the detent arms 2845 are again disabled.

It will be noted that six shoulders 2842 provided on the slide 2840 are sufficient to retain the register pinion assembly in nine different register selecting positions. Each of the shoulders 2842 may, therefore, be much larger and have much more hold on a detent arm 2845 than could be obtained if nine shoulders were formed on the same portion of the slide 2840 and within the same limited space to cooperate with a single detent arm 2845.

Figure 7:
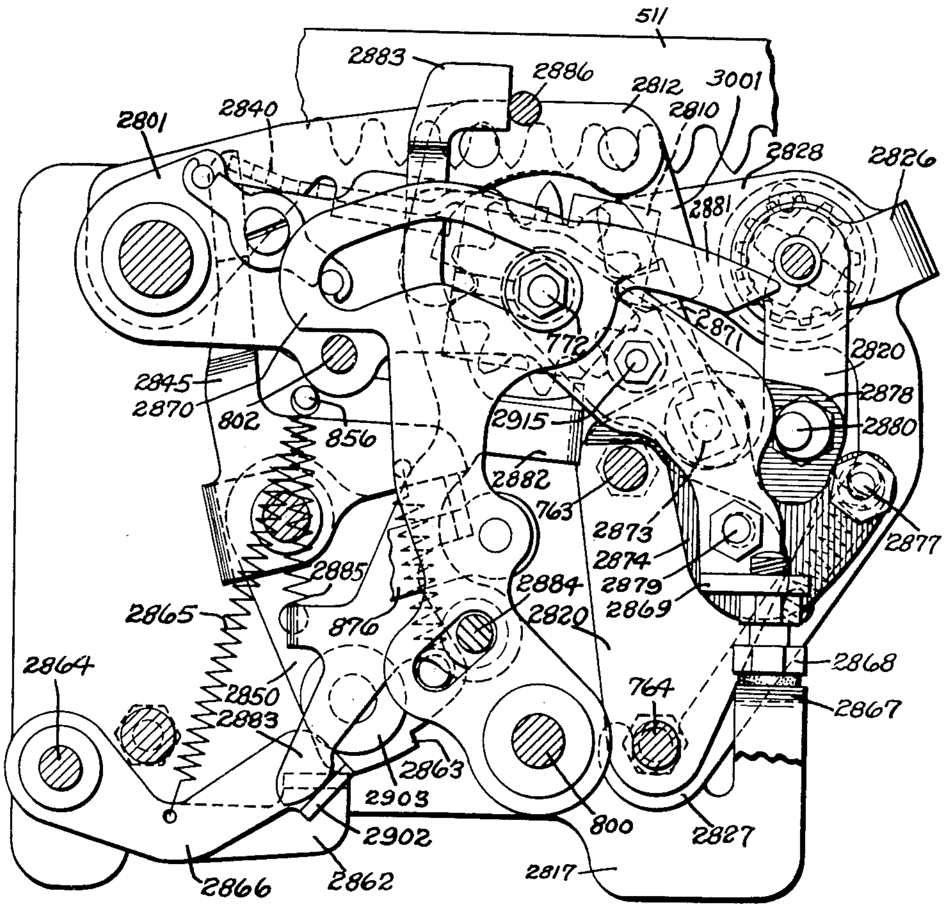
Figs. 7 and 8 are vertical fore and aft sections through the multiple register unit viewed leftwardly and rightwardly respectively.
Figure 8:
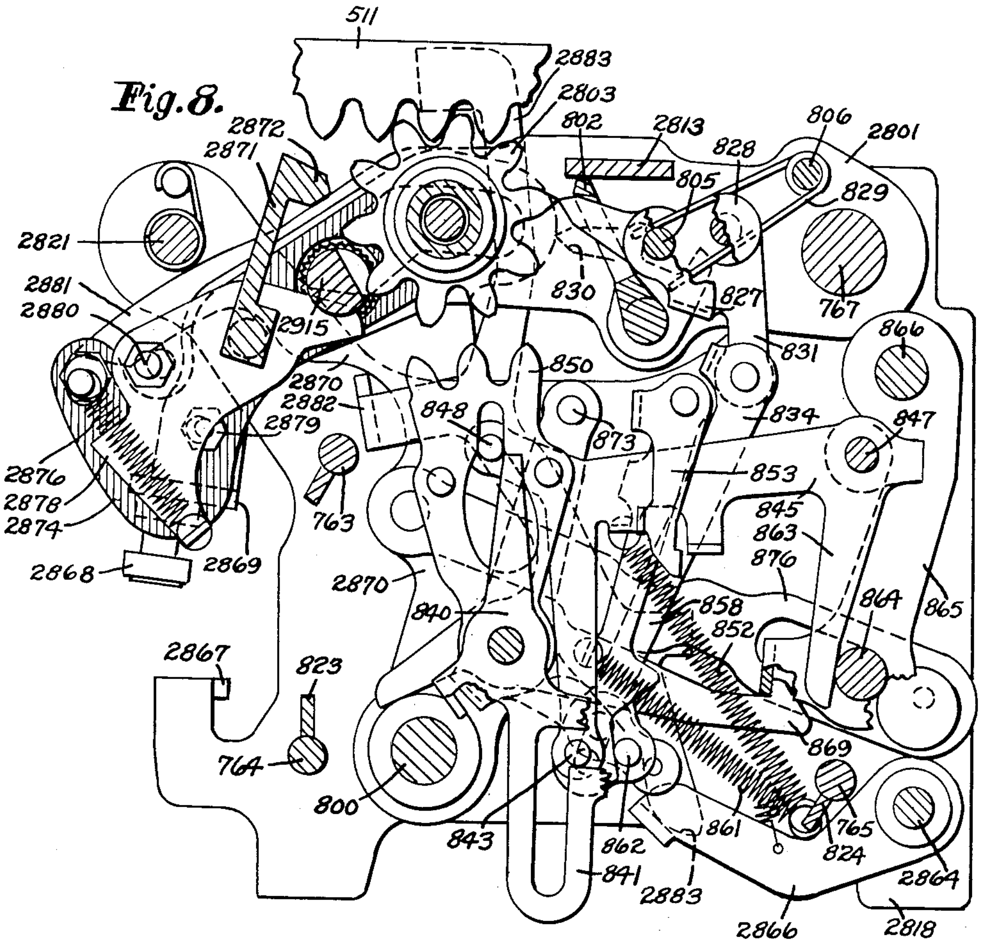

The multiple register unit has a transfer mechanism, the transfer segments 850 (Figs. 6, 7 and 8) of which are located to cooperate with the pinions 2803 of whichever one of the registers may be aligned with the actuator racks 511 during an operation of the machine. The transfer mechanism is like that of the crossfooter except for alternations resulting from omission of "fugitive 1" mechanism (comprising the crossfooter parts 885—904 and omission of the means included in the crossfooter (and comprising the elements 827—833 associated with the highest order pinion of the crossfooter and the elements 784—793 to position the negative total pinions 774 for direct negative total taking. The "fugitive 1" segment (897) of the crossfooter is replaced in the multiple register unit by a transfer segment 850 (Fig. 6) like that provided in the other orders but serves only to hold the units order pinion of the register in active position against rotation while it is disengaged from the units order actuator rack 511. Also because of the omission of the negative total pinions 774 the parts (770, 782 and 816) are also omitted.

The upper ends of projections 2867 (Figs. 3, 6, 7 and 8) extending upwardly from the lower rear corners of the register unit side plates 2817 and 2816 are turned horizontally to abut small pads on the heads of two screws 2868 threaded into the horizontally bent ends of projections 2869 extending downwardly from the rear ends of the pinion frame side plates 2801 and 2802. The screws 2868 may be secured by lock nuts after adjustment to permit the pinions 2803 of the register in active position to mesh fully with the transfer segments 850 and yet permit easy cross sliding of the register pinion assembly without the pinions catching on the transfer segments.

The means to rock register pinion frame and the shaft 767 to engage the pinions of the selected register with the actuator racks 511 and return them into engagement with the transfer segments, including the rollers 773 on the ends of the shaft 772, the cams 799, shaft 800, crank 911 and stud 912 is the same as in the crossfooter unit except that the right hand cam member (799) of the crossfooter is replaced by a cam member 2870 (Figs. 3, 6 and 7) having an added feature as described hereinafter.

Figure 9:
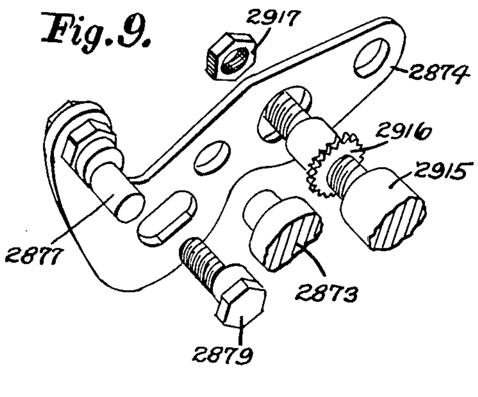
Fig. 9 is a detail of a portion of the structure shown in Fig. 3.

The bail (880) which, in the crossfooter unit, prevents accidental rotation of the pinions as they are moved from the transfer segments 850 to the actuator racks 511 and reversely, does so by engaging between teeth of the negative total pinions (774) which are omitted from the multiple register unit. That bail (880) and the supporting and moving parts (881—884) therefor are omitted from the multiple register unit which instead has a blade 2871 (Figs. 3, 5 and 8) formed with a forwardly directed flange 2872 along its upper edge and, at its ends, with trunnions 2873 on an axis which extends through the lower edge portion of the blade. The trunnions are pivotally supported in plates 2874 and 2875 pivoted on the end portions of the pinion shaft 772 against the inner sides of the plates 2801 and 2802, respectively. The blade 2871 is urged counterclockwise to engage its forwardly directed flange 2872 between teeth of the pinions 2803 by a tension spring 2876 connected at its upper end to a stud 2877 (see also Fig. 9) eccentrically mounted in a rearward extension of the plate 2874 and at its lower end to a lug on a lever 2878 secured on a bushing pinned on the right hand trunnion 2873. The upper edge of the rearward end of the lever 2878 is normally held against the stud 2877 by the spring 2876. By rotating the eccentrically mounted stud 2877 in the plate 2874, the extent to which the flange 2872 enters between teeth of the pinions 2803 can be closely adjusted, and the stud 2877 can then be secured in adjusted position by means of a nut on its threaded shank. The plates 2874 and 2875, and thus also the blade 2871 and its flange 2872 are adjustable angularly about the axis of the pinion shaft 772 by means of headed screws 2879 (Figs. 7, 8 and 9) having eccentric shouldered portions in slots formed in the plates 2874 and 2875 and elongated radially from the axis of the shaft 772, said screws also having shanks passing through the plates 2801 and 2802 with nuts threaded on their outer ends. The upper edge of the blade 2871 and its forward flange 2872 are notched in alignment with the brace plates 2812 and 3001 to avoid interference of the latter with the movements of the blade.

As the shaft 800 and the left and right cam arms 799 and 2870 are rocked clockwise to raise the pinions 2803 toward the actuator racks 511, the rightward end of a stud 2880 (Figs. 3, 5 and 7) eccentrically mounted in the lever 2878 rearwardly of the right trunnion 2873 is brought into contact with a cam end of a projection 2881 extending rearwardly from the right cam arm 2870. After the pinions of the selected register have been partially meshed with the racks 511, the projection 2881 depresses the stud 2880 and rocks the lever 2878 and blade 2871 clockwise to retract the flange 2872 from between the teeth of the pinions 2803 as the clockwise rocking of the shaft 800 is completed and the pinions of the selected register are fully meshed with the actuator racks 511. The pinions of the selected register are thus held against turning accidentally as they are unmeshed from the transfer segments 850 and until they are meshed with the racks 511. When the shaft 800 and cam arms 799 and 2870 are returned counterclockwise to unmesh the pinions of the selected register from the racks 511 and remesh them with the transfer segments 850, the projection 2881 moves away from the stud 2880 and permits the spring 2876 to re-insert the flange 2872 of the blade 2871 between teeth of the pinions 2803 before the pinions of the selected register have been unmeshed from the racks 511. During the latter part of the downward movement of the register pinion frame, after the pinions of the selected register have been partially meshed with the transfer segments, the forward end of the lever 2878 engages the upper edge of a leftwardly bent projection 2882 (Figs. 3 and 7) of a lever 2883 pivotally mounted leftwardly of the cam arm 2870 on a stud 2884 secured in and projecting leftwardly from the plate 2818 through a slot in the cam arm 2870. As the downward movement of the register pinion frame is completed, the lever 2878 is rocked clockwise to retract the flange 2872 from between the teeth of the pinions 2803 as the pinions of the selected register are fully meshed with the transfer segments.

Figure 10:
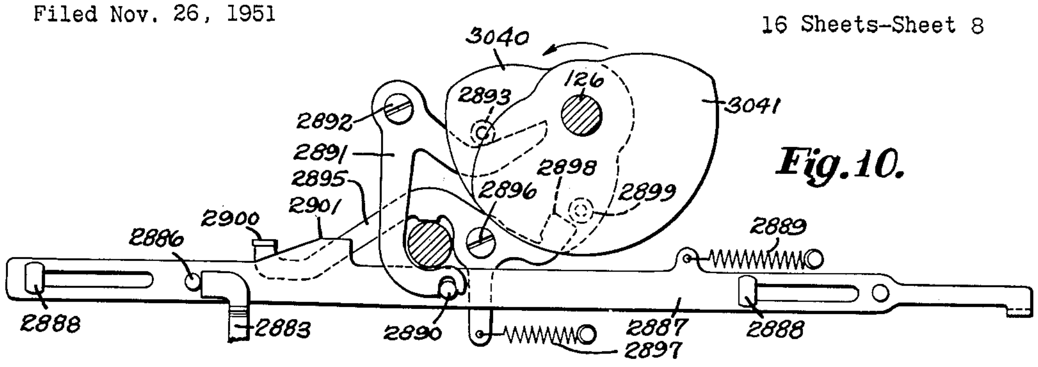
Fig. 10 shows portions of the register restoring control means in left side elevation.
Figure 11:
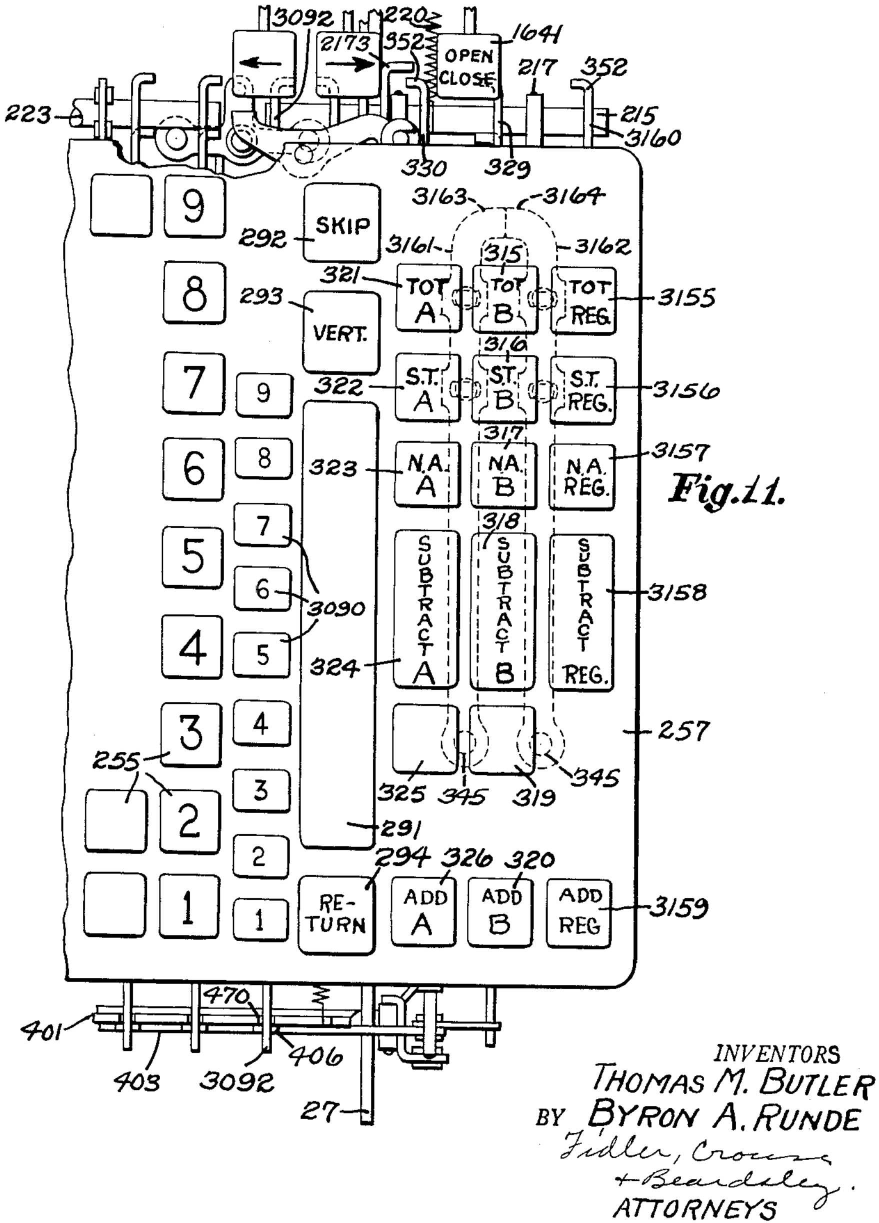
Fig. 11 is a plan view of a portion of the keyboard including the register selection and register function control keys.
Figure 12:
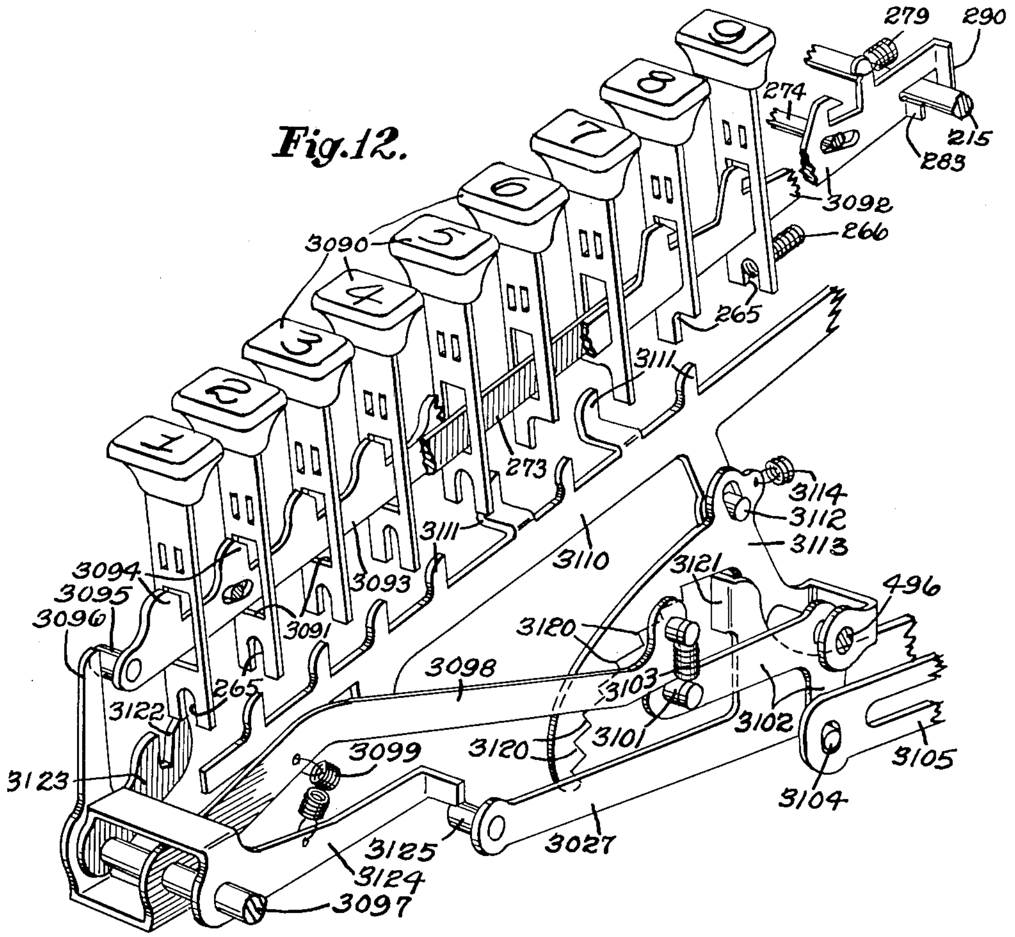
Fig. 12 is a perspective of the register selecting keys and portions of the mechanism controlled thereby as viewed from the lower right front corner.
Figure 13:
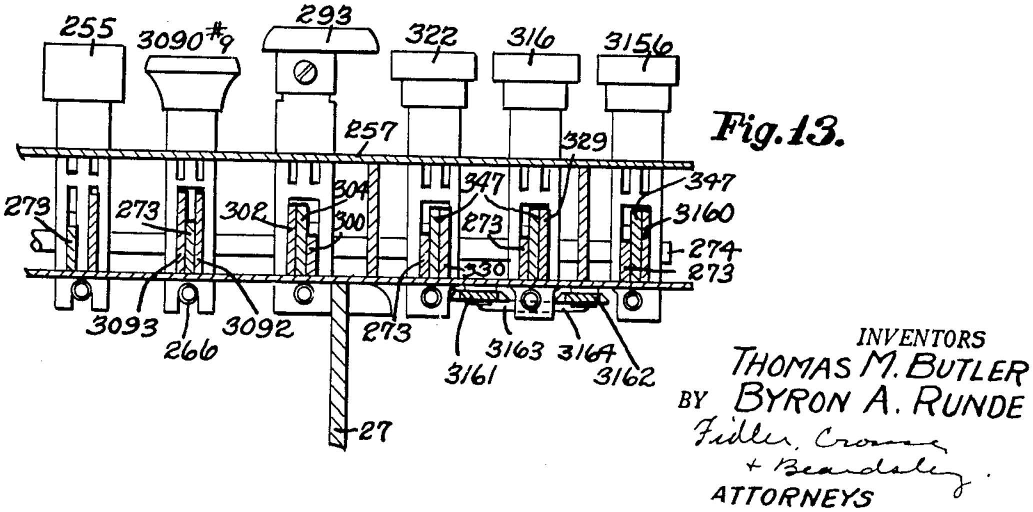
Fig. 13, is a transverse vertical section of the portion of the keyboard shown in Fig. 11.
Figure 14:
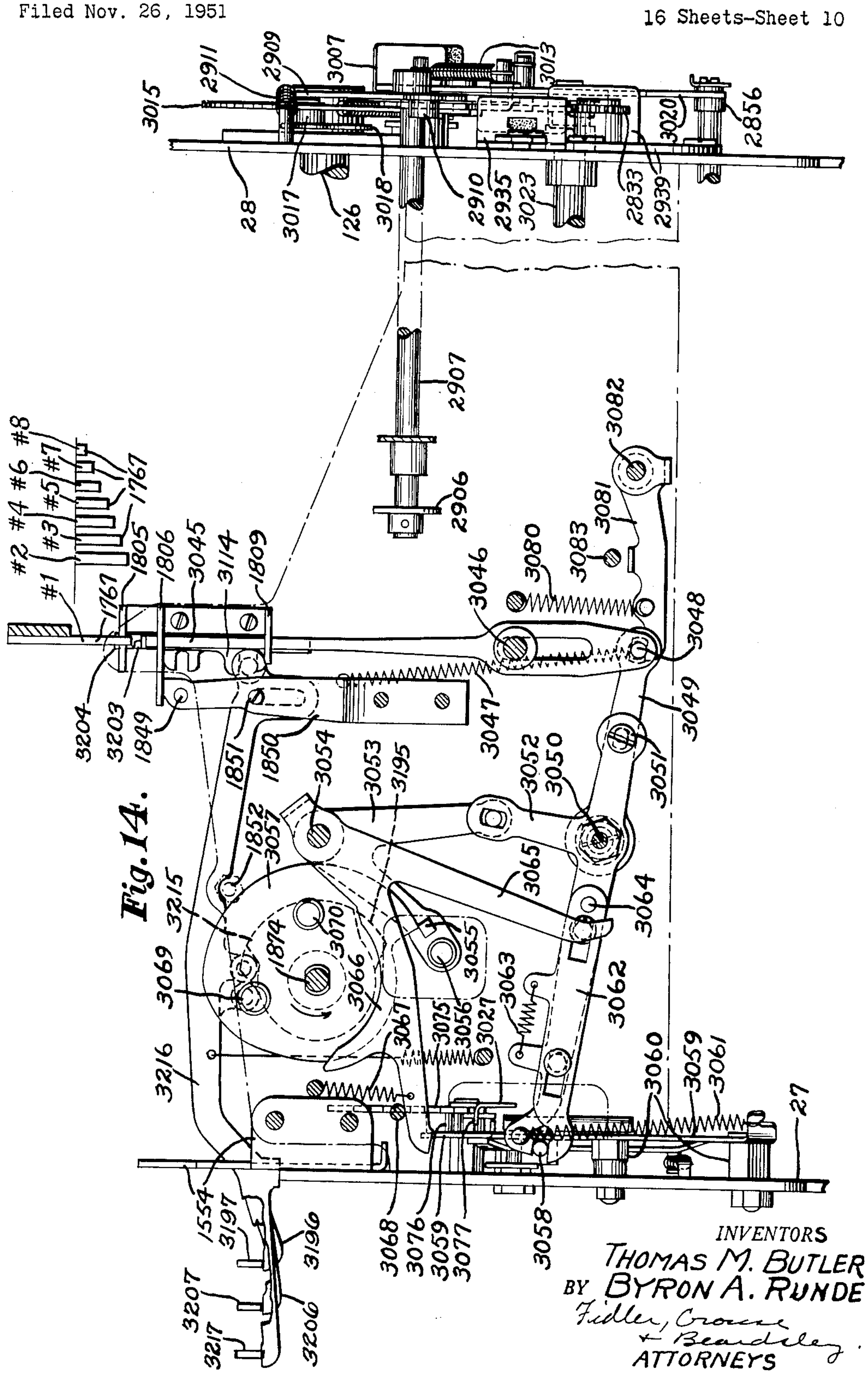
Fig. 14 is a rear elevation of portions of the automatic register selecting mechanism.
Figures 15, 16:
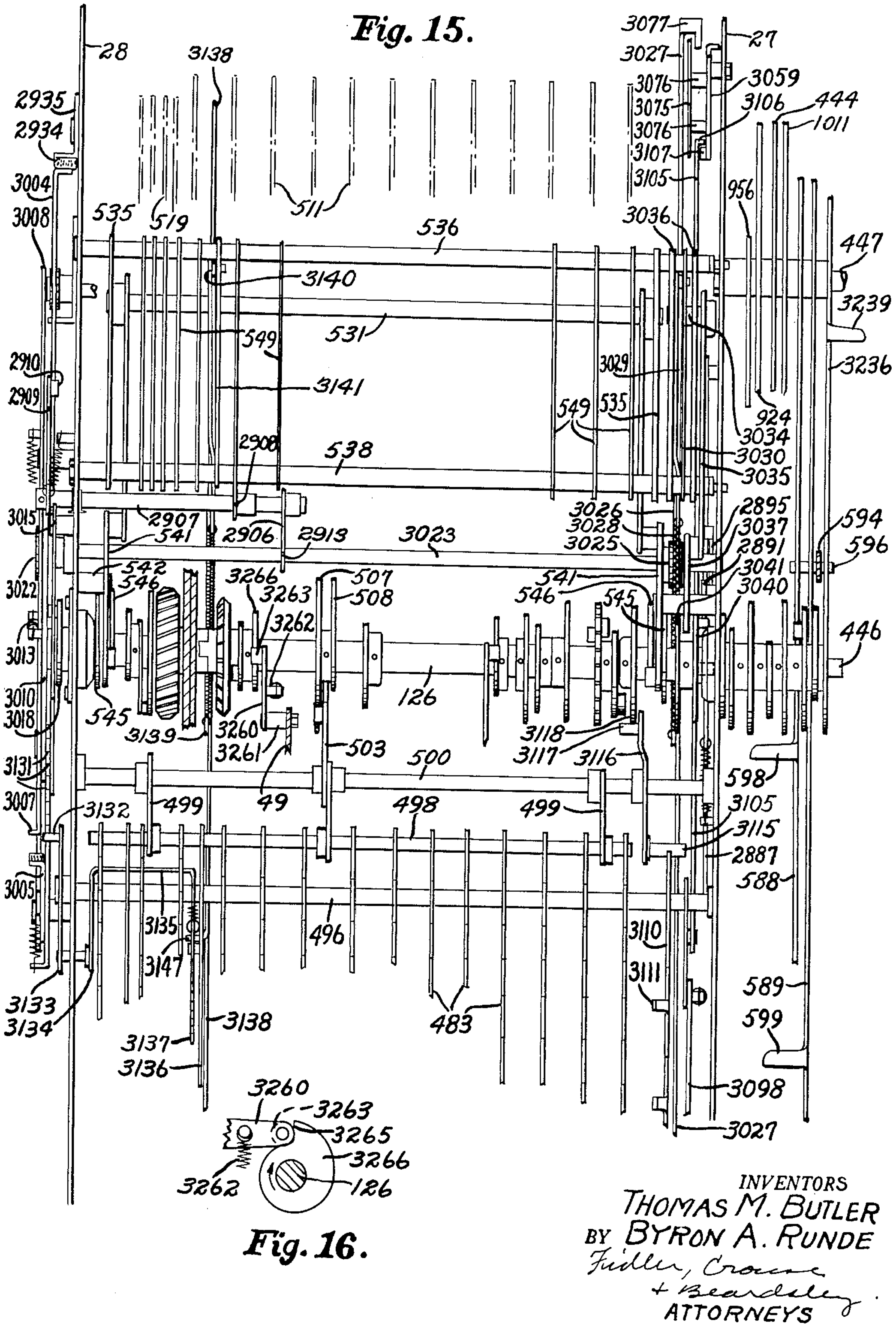
Fig. 15 is a partial plan of portions of the machine including portions of the register selecting mechanism.
Fig. 16 is a detail.

The lever 2883 is urged clockwise by a tension spring 2885 connected at its upper end to the shaft 856 and at its lower end to a leftwardly bent end of a forward projection of the lower arm of the lever 2883. The spring 2885 normally maintains a rearwardly directed portion of the upper end of the lever 2883 engaged against a stud 2886 secured in a slide 2887 (Fig. 10) mounted leftwardly of and close to the right frame plate 27 for forward and rearward sliding movement on grooved studs 2888 secured to the plate 27 and engaged in slots in the slide 2887. The slide 2887 is normally yieldingly held at the forward limit of its movement by a tension spring 2889 connected at its rear end to an ear on the slide and at its forward end to a stud secured in the plate 27. A stud 2890 secured in the slide 2887 is engaged in a slotted end of downward arm of a bell crank lever 2891 pivotally mounted on a stud 2892 secured in the plate 27. The forward arm of the bell crank 2891 is normally in the path of a roller 2893 mounted on a stud secured in a cam 3040 fixed on a hub pinned on the shaft 126. The parts are so arranged that the roller 2893 rocks the bell crank 2891 counterclockwise and moves the slide 2887 and its stud 2886 rearwardly from about the 5° to about the 45° point of each machine cycle, allowing the spring 2885 to rock the lever 2883 clockwise until the laterally bent portion of its rearward projection 2882 is stopped by the forward end of the lever 2878. The forward movement of the lower end of the lever 2883 allows the spring 2865 to rock the shaft 2864 and latch arm 2862 counterclockwise to engage the lug 2861 against the lower edge of the plate 2850. Consequently, when the latter is rocked clockwise by the cam 3020 to allow the detent arms 2845 to engage against the stepped portion of the slide 2840, the lug 2861 engages behind the shoulder 2863 to hold the plate 2850 in its clockwise position.

A detent lever 2895 (Fig. 10) is pivotally mounted on a shouldered headed screw 2896 threaded into the plate 27 and is urged clockwise by a tension spring 2897 connected at its rear end to a downward arm of the lever 2895 and at its forward end to a stud secured in the plate 27. The spring 2897 normally holds a laterally bent lug 2900 on the end of a rearward arm of the lever 2895 against the upper edge of the slide 2887. As the slide 2887 is moved rearwardly, the lug 2900 rides up an inclined rear edge of an upward projection 2901 on the slide 2887 and then drops down in front of the substantially vertical forward edge of the projection 2901 to latch the slide 2887 in a rearward position with the stud 2886 rearwardly clear of the lever 2883. Later in the machine cycle as the register pinion frame is rocked upward to engage the pinions 2803 of the selected register with the racks 511 and the lever 2878 is rocked clockwise to retract the flange 2872 of the blade 2871 from the pinions 2803, the forward end of the lever 2878 (Fig. 3) clears the upper edge of the rightwardly bent portion of the projection 2882 and allows the spring 2885 to rock the lever 2883 farther clockwise to place the projection 2882 under the forward end of the lever 2878 so that, when the register pinion frame is again lowered and the pinions of the selected register are engaged with the transfer segments 850, the flange 2872 is again retracted from the pinions 2803.

The blade 2871 and its flange 2872 remain latched in retracted position until about the 353° point to insure the completion of possible run-through tens-transfers such as will occur when an amount added in the selected register, previously containing an overdraft, is larger than the amount of such overdraft.

At about the 345° point in the machine cycle, a roller 2899 mounted on another stud secured in the cam 3040 encounters an upwardly pointed cam portion 2898 on the end of a forward arm of the detent lever 2895 and rocks the latter counterclockwise so that, at about the 347° point of the machine cycle, the latch lug 2900 on the rearward arm of the detent lever 2895 is lifted clear of the projection 2901 on the slide 2887 which is thereupon returned forwardly by its spring 2889 and causes the stud 2886 to engage the upper end of the lever 2883 and rock the latter counterclockwise to its normal position. As the lever 2883 is rocked counterclockwise it removes the projection 2882 (Fig. 3) from beneath the forward end of the lever 2878 slightly before the slide 2887 completes its forward movement at about the 353° point. The lever 2878 is thereupon rocked counterclockwise by its spring 2876 to re-enter the flange 2872 of the blade 2871 between the teeth of the pinions 2803. The lower end of the lever 2883 also acts upon a rightwardly turned rear end portion 2902 of the arm 2866 and rocks the latter, the shaft 2864 and the latch arm 2862 clockwise to disengage the latch lug 2861 from the shoulder 2863 on the lower edge of the plate 2850. This also occurs just as the slide 2887 is completing its forward movement. The plate 2850 is thus released to the action of the springs 2851, 2852 and 2853. The plate 2850 has a weight 2903 secured to it near its lower end so that when the rightwardly turned rearward projection 2849 of the plate 2850 strikes the rearward projections 2848 of the detent yokes 2846 at about the 362° point, the blow will be sufficient to surely disengage either of the detent arms 2845 from the shoulder 2842 engaging it, and the spring 2853 will move both detent arms 2845 to their forward inactive positions. If the register pinion assembly was in any register position other than its #1 register position, the coiled spring 2829 will rotate the shaft 2821 clockwise so that the thread 2824 will shift the collar 2825, the tube 2805 and register pinion assembly on the latter rightwardly to the #1 register position. Though the normal or #1 register position of the register pinion assembly is determined by limit means cooperating with the rack slide 3004 and described fully hereinafter, any more than a very slight overthrow of restoring movement of the register pinion assembly will be stopped by engagement of the leftmost shoulder 2842 against the leftward one of the detent arms 2845. The clockwise rotation of the shaft 2815 and pinion 2833 by the spring 2829, with assistance mentioned hereinafter, returns the rack slide 3004 to its normal rearward position.

The return movement of the register pinion assembly toward its normal #1 register position does not commence until about the 367° point. It will be remembered that because the machine cycling clutch 129, 134 is always disengaged at the end of each machine cycle, i. e., at the 360° point, and cannot re-engage until the toothed clutch disk 129 has rotated at least one tooth-space or 36° further, a machine cycle cannot commence prior to the 396° point. In a machine cycle in which the #9 register is selected and moved to active position, the register pinion assembly does not return fully to its normal #1 register position until about the 400° point. It is, therefore, desirable to insure that a machine cycle will not be initiated before the register pinion assembly has returned to normal from the position to which it was moved in a preceding machine cycle. For that purpose, the machine cycling clutch control arm 145 (Fig. 1) is provided with a forwardly extending lug 2905 bent laterally above a detent arm 2906 secured to the rightward end of a shaft 2907 journaled in the plate 28 and in an upward and forward extension 2908 which has been added to one of the members 549. A lever 2909 fixed on a hub secured on the left end of the shaft 2907 has a rearward arm carrying a roller 2910. A tension spring 2911 connected at its forward end to an upward arm of the lever 2909 and, at its rearward end, to a stud 2858 secured in the plate 28, yieldingly presses the roller 2910 downwardly against the upper edge of a cam projection 2912 on the register selecting rack slide 3004. Normally, the cam 2912 supports the roller 2910 so as to position a latch shoulder 2913 on the forward end of the arm 2906 downwardly clear of the lug 2905 where it will not prevent the arm 145 from swinging rearwardly to initiate a machine cycle. However, when the rack slide 3004 is moved a short distance forwardly of its normal position, the cam 2912 permits the roller 2910 to drop and the forward end of the arm 2906 to swing upwardly against the lug 2905. As disclosed in the Butler application, the arm 145 is returned rearwardly to its normal position near the end of each machine cycle. Such return of the arm 145 moves the lug 2905 rearwardly behind the latch shoulder 2913 and, if the cam 2912 on the register selecting rack slide 3004 is still too far forward to prevent, the latch shoulder 2913 will move up in front of the lug 2905 to block a cycle initiating movement of the arm 145. The cam 2912 is so proportioned as to move the latch shoulder 2913 clear of the lug 2905 when the register selecting rack slide 3004, in its return movement, reaches its #5 register selecting position, from which position its return to normal will normally be completed in very nearly the same time as is required for the arm 145 to move to release the clutch lever 142 and for the latter to move downwardly far enough to permit the machine cycling clutch to become engaged to cause a further rotation of the shaft 126. The above described interlock acts to lengthen the enforced pause to 72° (a two-tooth skip of the clutch) following a machine cycle in which one of the #6 to #9 registers is operated.

To prevent accidental rotation of the pinions 2803 of registers not aligned with the actuator racks 511 and transfer segments 850 during those times in the machine cycle in which the flange 2872 of the blade 2871 is retracted from the pinions 2803, a rod 2915 (Figs. 3 and 5) extending parallel to the shaft 772 between aligned tooth spaces of all of the pinions 2803 has reduced end portions threaded into sleeves 2916 (see also Fig. 9) which pass loosely through openings in the plates 2874 and 2875 and openings in the pinion frame end plates 2801 and 2802 and have knurled flanges adapted to be clamped against the edges of the openings in the plates 2874 and 2875 by means of nuts 2917 threaded onto the ends of the rod 2915. The rod 2915 is formed with notches 2918 to freely pass teeth of those pinions 2803 which are aligned with the racks 511 and transfer segments 850, i. e., the pinions of the register in active position. With the nuts 2917 loosened, the sleeves 2916 may be rotated to adjust the rod 2915 longitudinally to align the notches 2918 with the pinions of the active register and may also be adjusted transversely of its axis to properly align the pinions of the remaining registers after which the parts may be secured in adjusted position by tightening the nuts 2917.

Movements of the rack slide 3004 forwardly and of the multiple register pinion assembly leftwardly from their normal #1 register positions to manually and automatically selected register positions are effected by mechanisms shown in Figs. 1, 2 and 12 to 15.

The rack slide 3004 has a rightwardly turned rear end portion which normally, i. e., in the normal #1 register position of the slide 3004, bears against the forward face of a resilient cushion 2934 secured to a leftwardly turned part of a bracket adjustably mounted on the leftward face of the plate 28. The bracket has two forwardly and rearwardly spaced lugs 2936 extending rightwardly into forwardly and rearwardly elongated guide slots in the plate 28. The portion of the bracket 2935 which lies flat against the plate 28 has a vertically elongated slot embracing an eccentric portion of a collar 2937 which may be rotated to adjust the bracket forwardly or rearwardly after which the collar and bracket may be secured in adjusted position by tightening a headed screw passing through the collar and threaded into the plate 28. In the same manner, a second bracket 3005 is adjustably mounted on an upwardly extended forward end portion of the rack slide 3004. A cushion 3006 is secured to the rearward face of the leftwardly bent leg of the bracket 3005 to cooperate with but normally spaced forwardly from the forward face of a rightwardly bent portion of an upward projection 3007 of a slide 3008 also forwardly and rearwardly slidably mounted leftwardly of the rack slide 3004 on the grooved studs 2838. A tensioned coil spring 3009 secured at its rearward end on a stud in the slide 3008 and at its forward end to a leftwardly bent lug on the forward end of the slide 3004 urges the slide 3004 rearwardly relative to the slide 3008 to engage either the rear end of the slide 3004 against the stop cushion 2934 or the cushion 3006 against the projection 3007 of the slide 3008.

A latch hook 3010 is pivotally mounted at its rear end on a stud secured in the slide 3008. A stud 3011 secured in the slide 3004 projects leftwardly under the forward portion of the latch hook 3010 which has a relatively long straight lower edge terminating at its rear end in a rearwardly facing latch shoulder 3012. A tension spring 3013 connected between a stud secured in the slide 3008 and a stud secured in the latch hook 3010 urges the latter counterclockwise so that a stud 3014 secured in the latch hook 3010 and projecting rightwardly therefrom is normally engaged against the rearward portion of a relatively long horizontal upper edge on the forward portion of a lower forward arm of a lever 3015 which is pivoted on a stud 3016 secured in the plate 28. The lever 3015 has an upper forwardly curved arm normally engaged against a roller 3017 mounted on a stud secured in a crank arm 3018 fixed on a hub secured on the shaft 126. Within the first few degrees of each machine cycle, the roller 3017 is moved below the rear end of the roller-engaging edge of the upper arm of the lever 3015 and permits a tension spring 3019 which is connected between the upper arm of the lever 3015 and a stud secured in a plate 28, to rock the lever 3015 counterclockwise so that the spring 3013 is permitted to rock the latch hook 3010 counterclockwise slightly into engagement with the stud 3011.

The horizontal spacing of the vertical edge of the latch shoulder 3012 of the latch hook 3010 rearwardly of the front of the stud 3011 is substantially equal to the normal separation between the projection 3007 and the cushion 3006 so that the latch hook 3010 merely bears or slides on the stud 3011 until the slide 3008 is moved forwardly, by the means hereinafter described, sufficiently to take up the lost motion between the slides 3008 and 3004 and engage the projection 3007 against the cushion 3006. At that point in the forward movement of the slide 3008 the latch shoulder 3012 of the latch hook 3010 is pulled down in front of the stud 3011 by the spring 3013 and prevents the slide 3004 from bounding and overthrowing forwardly ahead of the slide 3008. During this portion of the movement of the slide 3008, a downward cam projection 3020 of the slide 3008 depresses the roller 2856, thereby rocking the shaft 2847 (Fig. 3) clockwise to cock the weighted plate 2850 and activate the detent arms 2845. As will be explained in detail hereinafter, the slide 3008 is moved forwardly at least to that extent in every cycle of operation of the machine and may be moved farther forwardly to select registers other than the #1 register. When the slide 3008 does move farther forwardly, it also, through the projection 3007, cushion 3006 and bracket 3005, moves the slide 3004 with it thereby rotating the pinion 2833 and shaft 2815 to shift the register pinion assembly rightwardly from its #1 register position.

The hereinafter described mechanism for moving the slide 3008 forwardly must be restored to normal considerably before the end of the machine cycle whereas the register pinion assembly, and thus also the rack 3004, are latched in their out of normal positions until after the 360° point of the cycle. Prior to the 235° point of the machine cycle the roller 3017 acts on the forward end of the upper arm of the lever 3015 to rock the latter clockwise thereby lifting the latch hook clear of the stud 3011 so that the slide 3008 will not be held forwardly by rack slide 3004. When the slide 3008 is returned rearwardly to normal, the cam projection 3020 is retracted from the roller 2856 so that the plate 2850 (Fig. 3), when it is released from the latch 2861, 2862 as previously described, can rock to restore the detent arms 2845 to their normal disable positions to permit the register pinion assembly to restore to its #1 register position.

The slide 3008 has, on its lower edge, a rack 3021 which meshes with a pinion 3022 secured on the left end a shaft 3023 (Figs. 2 and 15) which is journalled in the right-hand frame plate 27 and in a member 3024 secured to the left-hand frame plate 28. A second pinion 3025 secured on the shaft 3023 inwardly from the plate 27, meshes with a rack slide 3026. The rack slide 3026 is like the type indexing rack slides (523) of the Butler application and forwardly and rearwardly slidably mounted on a slide 3027 in the same manner as the type indexing rack slides (523) are mounted on the actuator racks 511 and 519. The rack slide 3026 is also urged to its rearmost position on the slide 3027 by a spring 3028 in the same manner as the type indexing rack slides (523) are urged rearwardly on the actuator racks 511 and 519. A coupling pawl 3029 like the coupling pawls (525) pivotally mounted on the type indexing rack slides (523) is similarly pivotally mounted on the rack slide 3026. For the coupling pawl 3029, there is provided a notched plate 3030 which is similar to the notched plates 549 which cooperate with the coupling pawls (525) carried by the type indexing rack slides (523) and is similarly mounted on the rods 536 and 538 but has nine notches 548 in it corresponding to the nine register selecting positions of the rack slide 3026. The slide 3027, like the actuator racks 511, carries a stud 3031 engaging in a cam slot 3032 in the pawl 3029 like the cam slots (526) on the pawls (525) on the type indexing racks (523) and the pawl 3029 also has a stud 3033 to cooperate with the notches in the plate 3030 as the studs on the pawls (525) on the type indexing rack slide (523) cooperate with the notches (548) in their associated notched plates 549. Because the indexing of the registers must be completed before the actuator racks 511 and 519 are moved from their normal "O" positions by the bail rod 531, a separate drive must be provided for the pawl 3029. For that purpose, a short rod 3034 secured in the rear end of a link 3035 extends leftwardly through forwardly and rearwardly elongated slots in two guide plates 3036 which are like the plates 535 which guide the bail rod 531 and are similarly mounted on the rods 536 and 538 on opposite sides of the notched plate 3030, the plates 3030 and 3036 being spaced from the rightward plate 535 and from each other by spacing collars on the rods 536 and 538.

The forward end of the link 3035 is pivotally mounted on a stud secured in the lower end of a lever 3037 pivotally mounted on the right-hand one of the studs 542 rightwardly of the right hand lever 541 and carrying a pair of roller studs 3038 and 3039 bearing, respectively, upon the edge of the previously mentioned cam disk 3040 and upon the edge of a second cam disk 3041 secured upon the same hub pinned on the shaft 126. The operation of the rod 3034 and slides 3026 and 3027 by the cams 3040 and 3041 is like the operation of the rod 531, the type indexing rack slides 525 and actuator racks 511 by their operating levers 541 and cams 545 and 546, except that rod 3034, guided in the slots in the plates 3036, moves forwardly from about the 8° point to about the 50° point in each machine cycle and remains at its forward limit to about the 235° point after which it moves rearwardly until at about the 285° point, it is again in its normal position. As the rod 3034 moves forwardly, it drives the coupling pawl 3029 and the slides 3026 and 3027 with it until the slide 3027 is arrested by means hereinafter described, whereupon, as the rack slide 3026 is driven a short distance farther forwardly stretching the spring 3028, its rearward end is cammed upwardly by the stud 3031 in the cam slot 3032 thereby engaging the stud 3033 in an appropriate notch in the plate 3030 and disengaging the pawl 3029 from the rod 3034 which continues forwardly to the end of its invariable stroke. In its return movement, the rod 3034 again lowers the rearward end of the pawl 3029 which is thereby re-coupled with the rod 3034 as the stud 3033 is disengaged from the notched plate 3030 and the rack slide 3026 is retsored to its normal relation to the slide 3027 with the aid of the spring 3028, after which both slides 3026 and 3027 are returned to their normal rearward positions by the rod 3034.

It will be noted that the rack slide 3026, driving the pinion 3025, shaft 3023, pinion 3022 and slide 3008 (Fig. 1), receives a short forward movement in each machine cycle even when the slide 3027 is not permitted any substantial forward movement and the stud 3033 becomes engaged in the rearmost notch 548 in the plate 3030, in the same manner as the amount type indexing rack slides (523) are moved a short distance forwardly in machine cycles in which their associated actuator racks 511 and 519 are held at their normal "O" positions. Such minimum forward movement of the rack slide 3026 moves the slide 3008 forwardly just far enough to engage the projection 3007 of the latter against the cushion 3006 on the bracket carried by the rack slide 3004 without displacing the #1 register from active position. In machine cycles in which the slide 3027 is not arrested until after it has moved forwardly far enough to permit the stud 3033 to engage in one or another of the notches forwardly of the rearmost notch in the plate 3030, the slide 3008 moves the rack slide 3004 forwardly and the latter drives the register pinion assembly leftwardly through distances proportional to the movement permitted to the slide 3027, the #9 register being brought to active position when the stud 3033 seats in the foremost notch in the plate 3030.

The present machine has the carriage governed control means disclosed in the Butler application with certain additions, hereinafter described in detail, including a carriage governed means to control selectively the register selecting forward movements of the slide 3027 and, thus, the selection of the registers. In the machine disclosed in the Butler application, twenty-five automatic control lanes were provided but several, including lane 25, were left unused. The carriage governed register selecting means of the present machine utilizes lane 25, and replaces the register selecting mechanism of the Runde application. In the present machine, a sensing pin 3045 (Figs. 2 and 14) has its upper portion vertically slidably guided in the lane 25 apertures in the apertured guide plates 1806 and 1809 and has in its lower portion a vertically elongated guide slot through which passes a headed shouldered screw stud 3046 which also passes through a collar spacing the sensing pin 3045 from the rear frame plate 45 into which the screw 3046 is threaded.

Then sensing pin 3045 is urged upwardly by a tension spring 3047 anchored at its upper end to the bracket 1850 and connected at its lower end to a stud 3048 secured in and projecting forwardly from the lower end of the sensing pin. The stud 3048 is embraced in a radially elongated slot in the end of a leftward end of an arm 3049 secured on a hub rockably supported on a shouldered stud 3050 secured in the rear frame plate 45. A screw stud 3051 rotatably adjustably secured in the arm 3049 has an eccentric shoulder in an aperture in the end of a leftward arm of a three-armed lever 3052 rockably supported on the hub of the arm 3049 between the arm 3049 and a shoulder on the stud 3050. An upward arm of the lever 3052 has a radially elongated slot embracing a stud secured in the lower end of one arm of a cam-follower lever 3053 rockably supported on a stud 3054 secured in the plate 45.

The lever 3053 has a second arm in which a squared stud 3055 and a stud supporting a roller 3056 are secured. The stud 3055 and roller 3056 cooperate with the edge of a cam disk 3057 mounted in the lane 25 position on the sensing control cam shaft 1874 for rotation therewith. A rightward third arm of the lever 3052 is located above a stud 3058 secured in a rightwardly turned lug on the rear edge of a slide 3059 vertically slidably mounted on headed shouldered screws passing through vertically elongated slots in the slide 3059 and threaded into posts 3060 eccentrically adjustably mounted in and projecting leftwardly from the right side frame plate 27. The rightward arm of the lever 3052 is normally held downward against the stud 3058 by a tension spring 3061 connected between a stud in the rightward arm of the lever 3052 and a notched lug extending rearwardly from the lower end of the slide 3059.

A slide 3062 is slidable lengthwise of the rightward arm of the lever 3052 on a pair of headed studs passing through slots in the slide 3062 and secured in said arm. A tension spring 3062, connected between eyed lugs on the upper edges of the slide 3062 and rightward arm of the lever 3049, normally maintains the slide 3062 at its rightward limit where its rightward end is immediately under the stud 3058. A stud 3064 secured in the leftward end of the slide 3062 projects rearwardly at the left side of the lower end of a downward arm 3065 of a two-armed lever 3065, 3066 which is rockably mounted on the stud 3054. A tension spring 3067 which is connected between the rightward arm 3066 of the lever 3065, 3066 and a stud secured in the back plate 45 normally yieldingly holds the arm 3066 against the underside of a limit stud 3068 secured in and projecting forwardly from the plate 45. The arm 3066 has an upper cam edge to cooperate with two rollers 3069 and 3070 mounted on studs on the rear side of the cam disk 3057.

The rightward end of the arm 3066 is located above a rearward arm of a detent pawl 3071 which is pivotally mounted on a stud 3072 projecting leftwardly from and eccentrically adjustably mounted in the plate 27. A tension spring 3073, connected between a downward detent arm of the pawl 3071 and a stud secured in the plate 27, normally yieldingly holds the lower end of the detent arm of the pawl 3071 engaged rearwardly against one of a series of downwardly and forwardly stepped shoulders 3074 formed on the lower portion of the forward edge of the slide 3059. A plate 3075 having a forwardly and upwardly stepped series of shoulders is secured on the leftward ends of two studs 3076, the rightward ends of which are secured in the upper portion of the slide 3059. The slide 3027 has at its rearward end, a lug 3077 bent rightwardly just below and just rearward of the lower edge of the stepped plate 3075.

In each machine cycle in which the automatic sensing controls are active (not disabled by means disclosed in the Butler application), the control cam shaft 1874 with the disk 3057 thereon is driven clockwise one revolution by the shaft 126 as the latter also turns through one revolution. At about the 5° point in the cycle, the high point of the cam disk 3057 passes beyond the stud 3055, releasing the levers 3053 and 3052, arm 3049 and the sensing pin 3045 to the action of the spring 3047. The initial portion of the upward movement of the sensing pin 3045 and rocking of the arm 3049 and levers 3052 and 3053 is accelerated rapidly by another tension spring 3080 connected between a stud secured in the back plate 45 and a stud secured in an intermediate portion of a lever 3081, the left end of which is pivoted on a stud 3082 secured in the plate 45 and the rightward end of which is under and normally engages the stud 3048 in the lower end of the sensing pin 3045. The lever 3081 is arrested by another stud 3083 secured in the plate 45 just before the sensing pin 3045 has moved upwardly far enough to engage the longest (#1) control projection 1767 which might be above it in lane 25 in the automatic control program unit assembled on the member 1731 on the paper carriage. The upward movement of the tensing pin 3045 is continued by the spring 3047 alone until either the upper end of the pin 3045 encounters a control projection 1767 in lane 25 above it or the pin 3045 reaches the upper limit of its movement. As the sensing pin 3045 rises, it rocks the arm 3049 clockwise and, through the stud 3058, lowers the slide 3059 and the stepped plate 3075.

When the sensing pin 3045 is stopped by a #1 control projection 1767, the plate 3075 is positioned so that its rearmost edge is positioned in front of the lug 3077 on the slide 3026. If, however, the sensing pin 3045 encounters, instead of a #1 projection 1767, any of the progressively shorter #2 to #8 control projections 1767, the plate 3075 will move to proportionately greater distances downward to position vertical shoulders which are progressively farther forward on the plate 3075 in the path of the lug 3077. When the sensing pin 3045 encounters no control projection 1767 above it and moves to its upward limit, the highest most forward shoulder on the plate 3075 is positioned in the path of the lug 3077.

As the slide 3059 is lowered, the lower end of the downward detent arm of the pawl 3071 is pulled rearwardly over successive ones of the nine steps 3074 on the rear edge of the slide 3059 to prevent, for a while, upward return of the slide 3059 and plate 3075. The rightward end of the slide 3062 on the lever 3049, engaging under the stud 3058, prevents overthrow of the slide 3059 and plate 3075 when the movement of the sensing pin 3045 and lever 3049 is arrested. Thus the plate 3075 is positioned in accordance with the selected register very rapidly between about the 5° point and about the 10° point in the machine cycle and without undesirable overthrow or rebound.

At about the 8° point in the machine cycle, the drive stud 3034 and, with it, the slide 3027 start forward. The slide 3027 continues forward until its lug 3077 encounters one of the vertical shoulders on the upper side of the plate 3075, and is thereby arrested whereupon the stud 3033 enters the appropriate notch in the plate 3030 as the rack slide 3026 moves a fixed short distance farther forward and is then arrested while the drive stud 3034 continues to its forward limit. The lowest and rearmost vertical edge portion of the plate 3075, when positioned in front of the lug 3077, prevents any substantial forward movement of the slide 3027 and thus limits movement of the rack slide 3026 to that necessary to close the space between the projection 3007 and the cushion 3006 (Fig. 1) so that the #1 register remains in active position. The horizontal spacing of the stepped shoulders on the plate 3075 is appropriate to the distances which the slide 3027 must move forwardly of its normal position to permit the rack slide 3026 to drive the register pinion assembly to the respective ones of its #2 to #9 register positions.

If the automatic controls are disabled by the means disclosed in the Butler application, the control cam shaft 1874 does not rotate during the machine cycle so that the plate 3075 remains in its normal position and the lug 3077 moves forwardly under the bottom edge of the plate 3075 until, in its #9 register selecting position, it encounters a projection 3085 which extends downwardly from the plate 3075 with its rear edge vertically aligned with the rear edge of the highest step on the plate 3075. Thus, when the automatic controls are disabled as well as when the automatic controls are active but no control projection 1767 is located above the sensing pin 3045 in lane 25, the #9 register will be selected unless the manual register selecting means described hereinafter is effective to select a different one of the registers.

The front vertical edge of the plate 3075 bears against a roller 3086 which is mounted on a stud eccentrically adjustably secured in the plate 27 and takes the thrust of the lug 3077 against the plate 3075.

Substantially after the 50° point in the machine cycle, i. e., after the slide 3027 has had sufficient time to move to its #9 register selecting position and the lug 3077 can be relied upon to hold the plate 3075 and slide 3059 in the selected downward position, but prior to the 100° point in the machine cycle, the roller 3069 depresses the arm 3066 and rocks it far enough clockwise so that it engages the rearward arm of the detent pawl 3071 and restores the latter a little beyond normal position. At the same time the arm 3065 of the lever 3065, 3066, acts on the stud 3064 and moves the slide 3062 leftwardly, withdrawing its end from beneath the stud 3058. Subsequently, from abouft the 100° point to about the 195° point in the machine cycle, the rise on the edge of the cam disk 3057 acts on the roller 3056 to restore the levers 3053 and 3052, arm 3049 and the sensing pin 3045 to normal prior to the time at which a tabulating or return movement of the paper carriage can begin. Near the end of the machine cycle, the drop-off of the cam edge of the disk 3057 passes beyond the roller 3056 but the squared stud 3055 then holds the levers 3053, 3052 and 3049 and the sensing pin 3045 in normal position until the 5° point in the next machine cycle. Before the roller 3069 leaves the upper cam edge of the arm 3066, the roller 3070 moves onto said cam edge and holds the slide 3062 withdrawn from under the stud 3058 until after the slide 3059 and plate 3075 are restored to normal.

The drive stud 3034 commences its rearward movement at about the 235° point in the machine cycle and completes the return of the rack slide 3026 and the slide 3027 to normal at about the 285° point. The plate 3075 and slide 3059 are returned upwardly to normal by the spring 3061 as permitted by the rearwardly returning lug 3077. Substantially after the plate 3075, slide 3059 and stud 3058 have returned to normal position at about the 285° point in the machine cycle, the roller 3070 passes off of the arm 3066, permitting the lever 3065, 3066 to be returned to normal by the spring 3067 and the rightward end of the slide 3062 to be moved to normal position under the stud 3058 by the spring 3063. The register pinion assembly and the rack slide 3004 remain held in the selected register position by one of the detent arms 2845 until released and restored as previously described.

Regardless of whether the automatic controls are active or disabled by the means disclosed in the Butler application, the registers of the present machine may be selected manually by means of the register selecting keys 3090 shown in Figs. 2, 11, 12, 13. The nine register selecting keys 3090, located in a row intermediate the lowest order row of amount keys 255 and the row of motor bars 291—294 (Fig. 11), are generally similar to the amount keys 255 but have smaller key tops and are generally similarly mounted in the keyboard. Their stems (Figs. 12 and 13) are similar to certain of the date and character keys (256) in that they each have a single wide lower slot 3091 like the lower wide slots (286) in such date and character keys (256). Also the portions of the lower ends of the stems rightward of the notches 265 therein are cut off of the stems of the #6 key 3090 and of the #8 key 3090 and the portion of the stem leftward of the notch 265 is cut from the stem of the #7 key 3090. The keys 3090 are mounted more closely together than the nine keys 255 of an amount key row with the front of the #1 register key top about in line with the front of the "1" keys 255 and with the front of the #9 register key top about in line with the front of the "7" keys 255. The spacing of the keys 3090 is the same as the spacing of the front nine date or character keys (256) in a date or character key row. The row of register selecting keys 3090 is provided with a strip 273 located centrally in the slots 3091, and with a restoring spring 266 like those for the other key rows. A key latch slide 3092 like the key latch slide (284) of the month key row and similarly mounted and operated, is located at the right side of the strip 273 in the slots 3091.

Additionally, the row of register selecting keys 3090 is provided with a cam slide 3093 which is located at the left of the strip 273. The cam slide 3093 has forwardly and rearwardly elongated slots through which pass the rods 274 upon which the slide 3093 is forwardly and rearwardly slidably supported. For each key 3090 the cam slide has on its upper edge a cam portion 3094 having an inclined cam edge which, in the normal position of the slide 3093 extends from a high point slightly forward of the upper end of the slot 3091 of the respective key downwardly to a point substantially rearward of that key stem. In its forward end, the cam slide carries a stud 3095 projecting leftwardly immediately behind the upper end of an upward left side arm 3096 of a yoke member rockably mounted on a stud 3097 secured in and extending leftwardly from the frame side plate 27. The yoke member 3096, 3098 is urged clockwise by a tension spring 3099 connected between the rearward right side arm 3098 of the yoke member and the lower forward portion of the guide strip 39 (Fig. 2), so that the arm 3096 normally holds the slide 3093 at the rearward limit of its movement on the rods 274. The rearward end of the arm 3098 projects over a stud 3101 secured in the forward arm of a bell crank 3102 rockably mounted on the shaft 496. A tension spring 3103 connected between the stud 3101 and a stud in the arm 3098 normally holds the stud 3101 engaged against the lower edge of the rear end of the arm 3098. A downward arm of the bell crank 3102 carries a stud 3104 engaged in an aperture in a slide 3105 having on its rear end a lug 3106 bent rightwardly with its upper edge just below and normally immediately rearward of the rearward edge of a lug 3107 bent leftwardly from the slide 3059.

When any register selecting key 3090 is depressed, its stem acts on the associated cam projection 3094 to move the cam slide 3093 forwardly, rock the yoke member 3096, 3098 counterclockwise and the bell crank 3102 clockwise and pull the slide 3105 forwardly to position the lug 3106 under the lug 3107 to prevent downward movement of the slide 3059, whereby carriage-governed automatic register selection is prevented.

Under the row of register selecting keys 3090, a differential stop slide 3110 (Figs. 2 and 12) is mounted in the guide stops 39 and 40 in the same manner as the differential stop slides (483) for the amount key rows. The stop slide 3110 has a stop lug 3111 for each of the #2 to #9 register keys 3090 but none for the #1 register key. A downward projection of the slide 3110 carries a stud 3112 engaged in an aperture in a stop sector 3113 rockably mounted on the shaft 496 and urged clockwise by a tension spring 3114 connected at its forward end to the sector 3113 and anchored at its rear end upon the shaft 218. The stop slide 3110 is normally held in its forward position of Fig. 2 by engagement of the end of its lower rearward portion against a stud 3115 in the upper end of a forward arm of a bell crank 3116 having a hub rotatable on the shaft 500. A roller 3117 mounted on a stud secured in a rearward arm of the bell crank 3116 bears on the trailing end part of the high portion of the edge of a cam disk 3118 secured on a hub pinned on the shaft 126.

The high portion of the edge of the cam disk 3118 passes the roller 3117 at about the 10° point in the machine cycle. If no register selecting key is in depressed position, the spring 3114 is permitted to pull the sector 3113 clockwise, the stop slide 3110 rearwardly and the bell crank 3116 clockwise until the slide 3110 limits on the rear guide strip 40 at about the 36° point of the machine cycle. If the #9 register selecting key is in depressed position, the result is the same as when no register selecting key is depressed. The stop lug 3111 for the #2 register selecting key is so positioned relative to the stem of that key that if the latter is in depressed position, no substantial movement is permitted the stop slide 3110. The stop lugs 3111 for the #3 to #8 register selecting keys are so positioned as to permit the stop slide 3110 to move rearward through distances increasing progressively with the values of the numerals borne by the keys.

The stop slide 3110 is located beneath the right hand sides of the stems of the register keys 3090 and the stops 3111 for the #2, #3, #4, #5, #7 and #9 registers cooperate with the portions of the stems of the respective keys 3090, when depressed, which are at the right side of the notches 265 for the spring 266. The portion rightward of the notch 265 for the spring 266 is removed from the stems of the #6 and #8 register selecting keys to clear the lugs 3111 for the #7 and #9 registers, respectively. The lugs 3111 for the #6 and #8 registers are offset leftwardly to cooperate with the portions of the stems of the #6 and #8 register keys at the left of the notches 265 in those stems respectively. The portion of the stem of the #7 register key leftwardly of the notch 265 therein is removed to clear the lug 3111 for the #8 register.

The sector 3113 is formed with a series of eight stepped shoulders 3120, one for each of the #2 to #9 registers, to cooperate with a leftwardly bent lug 3121 on the upper end of an upward projection of the slide 3027. The shoulders 3120 are so arranged as to be positioned in the path of the upper edge portion of the lug 3121 when the slide 3110 is arrested by the key 3090 for the corresponding register and to limit the forward movement of the slide 3027 so that the rack slide 3026 will be driven only to the proper position to select the register corresponding to the depressed key.

The leftward portion of the lower end of the stem of the key 3090 for the #1 register is immediately above a rear cam edge 3122 of an upwardly open slot in an arm 3123 extending rearwardly and upwardly from the left side of a yoke member rockably supported on the stud 3097 and having, on its right side, a rearwardly extending arm 3124 with its rear end portion bent rightwardly immediately forwardly and normally upwardly clear of a stud 3125 secured in and projecting leftwardly from the forward end of the slide 3027. When the #1 register selecting key 3090 is depressed, the leftward portion of the lower end of its stem acts on the cam edge 3122 to cam the yoke member 3123, 3124 to rock the latter clockwise sufficiently to place the rearward end of the arm 3124 immediately in front of the stud 3125 to prevent any substantial movement of the slide 3027 and thus cause the #1 register to remain in active position. In machine cycles in which the #1 register key is in depressed position the stop slide 3110 and stop sector 3116 are also moved to the rearward limit of the slide 3110 on the guide strip 40.

The cam 3118 acts from about the 240° point to about the 315° point in the machine cycle to return the bell crank 3116, the stop slide 3110 and the stop sector 3113 to normal position.

From the foregoing it will be apparent that, in cycles of operation of the machine when the automatic carriage governed register selecting mechanism is inactive or no register selecting control projection 1767 is above the sensing pin 3045 and, at the same time, no register selecting key 3090 is in depressed position, the #9 register will be brought into active position. If, however, a register selecting key 3090 is in depressed position, the automatic register selecting means will be disabled by means operated by depression of the register selecting key and the register corresponding to the depressed key 3090 will be brought to active position.

To identify, on the printed records produced by the machine, the register in active position during a cycle of operation of the machine, a type bar 3130 (Figs. 1 and 23) has been immediately inserted rightward of the front crossfooter function-symbol type bar 562. The type bar 3130 has types for the digits from "1" to "9" but the latter are arranged in the order reverse from that on the amount printing type bars, the "1" type being in the lowest position on the type bar 3130. It will be remembered that the rack slide 3004 (Fig. 1) is held in a position appropriate to the register selected for operation in that machine cycle from about the 50° point earlier until about the 367° point of the cycle. The indexing of the register identifying type bar 3130 is controlled from the rack slide 3004 which, for that purpose has, on its upper edge, a series of eight upwardly and forwardly spaced steps 3131, the top of the foremost one of which is normally immediately under a stud 3132 secured in and projecting leftwardly from the rear end of a two-armed lever 3133 rockably supported intermediate its ends on the extended left end of the shaft 496 between the slide 3004 and the left side frame plate 28. The forward end of the lever 3133 has a forwardly open slot embracing a stud secured in and extending leftwardly, through an opening in the plate 28, from the forward end of a left side arm 3134 of a yoke member 3135 (Fig. 15) rockably supported on the shaft 496 rightwardly of the plate 28.

The rightward side of the yoke 3135 is formed integrally with a stop sector 3137 (Figs. 1 and 15) like the stop sectors (491) of the amount orders 1 to 11 and located between the 11th and 12th order stop sectors (491). The sector 3137 is part of a new order of differential mechanism inserted between the 11th and 12th order differential mechanisms and including a stop slide 3136, an actuator slide 3138 similar to the actuator racks 511 but without rack teeth on its lower edge, a type indexing rack slide 3139 like the type indexing rack slides (523) in other orders and having a drive pawl 3140 like the drive pawls (525) of other orders cooperating with the drive bail 531, and a notched locking plate 3141 like the notched locking plates (549) of the other orders of the amount differential mechanism. The nine lugs 484 on the slide 3136 are without function but a tension spring 3142, like the springs (501) connected to the stop slides (483) in other orders is connected between the rod 502 and the upward arm 3143 of the stop sector 3137 so that the slide 3136 and sector 3137 are operated by the bail 498 in the same manner as the stop slides (483) and stop sectors (491) in other orders.

In a machine cycle in which the #1 register remains in active position, the foremost and uppermost step 3131 on the register indexing rack slide 3004 prevents the lever 3133, yoke 3135, sector 3137 and slide 3136 moving substantially from their normal positions as the bail 498 moves rearwardly. If, however, any one of the #2 to #9 registers has been placed in active position by forward movement of the rack slide 3004, the slide 3136 will follow the bail 498 rearwardly and the stop sector 3137, yoke 3135 and lever 3133 will be rocked clockwise by the spring 3142 until the stud 3132 is arrested on that step 3131 of the rack slide 3004 corresponding to the register in active position. The actuator slide 3138 has a lug 3147 corresponding to the lug (510) on each of the actuator racks 511 of the 1st to 11th orders, so that when the actuator slide 3138 is driven forwardly, it is arrested by engagement of the lug 3147 with one of the nine stops shoulders 3148 of the stop sector 3137. When the #9 register is in active position, the rearmost stop shoulder 3148 of the sector 3137 prevents any substantial forward movement of the actuator rack slide 3138 but when any one of the #1 to #8 registers is in active position, the corresponding stop shoulder 3148 permits forward movement of the actuator rack slide 3138 inversely proportional to the ordinal number of the active register. The drive pawl 3140 and type indexing rack slide 3139 operate in the same manner as the drive pawls (525) and type indexing rack slides (523) of other orders, the rack slide 3139 moving forwardly after the actuator rack slide 3138 is arrested by the stop sector 3137 to an extent corresponding to the distance which the type bar 3130 must be elevated from its normal position to place its uppermost type (the "9" type on that bar) at the printing line.

Figure 1:
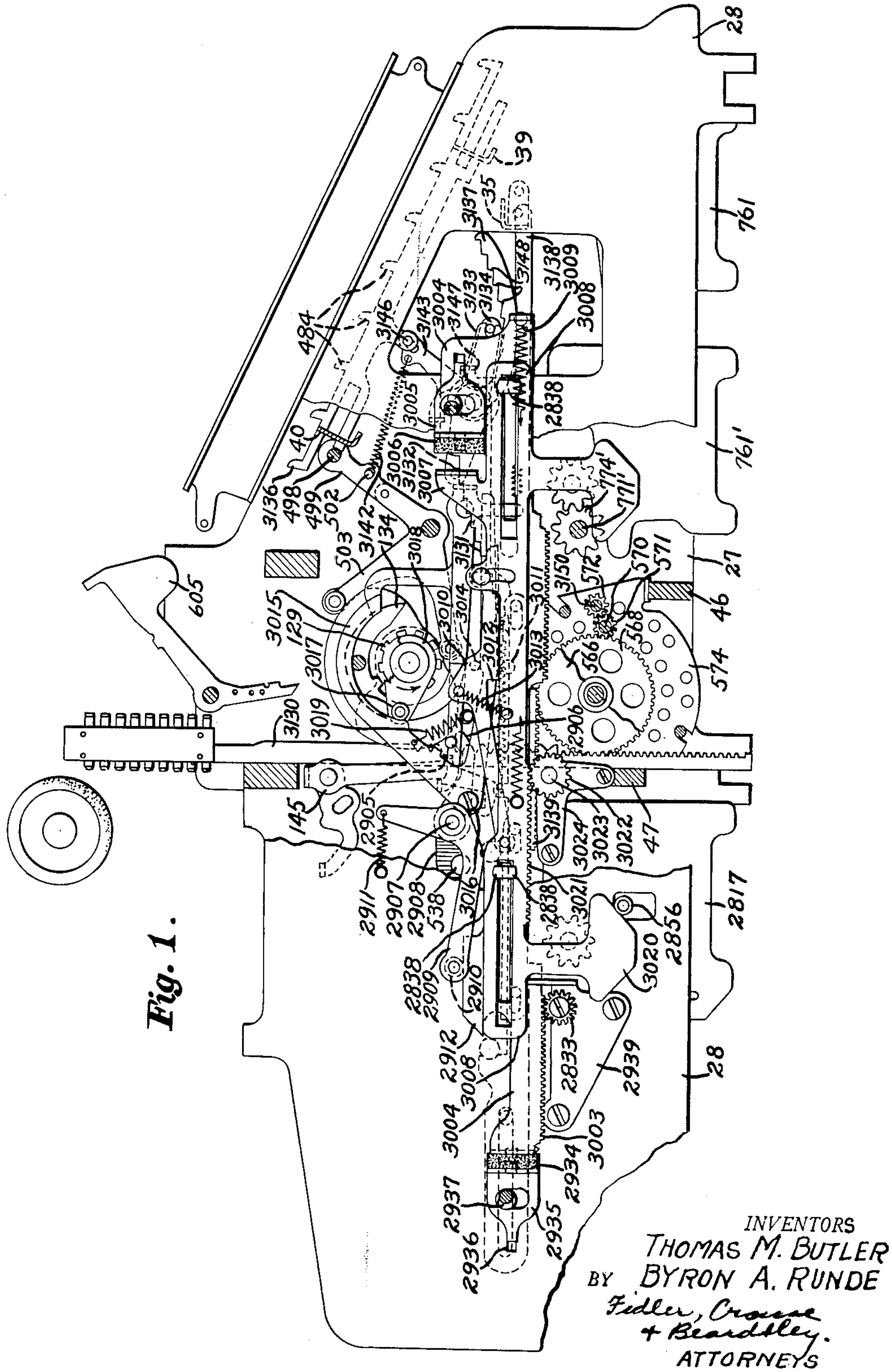
Fig. 1 is a left side elevation of a machine embodying the present invention, with some elements of the machine omitted and others broken away to more clearly reveal portions of the invention.
Figures 1A, 1B:
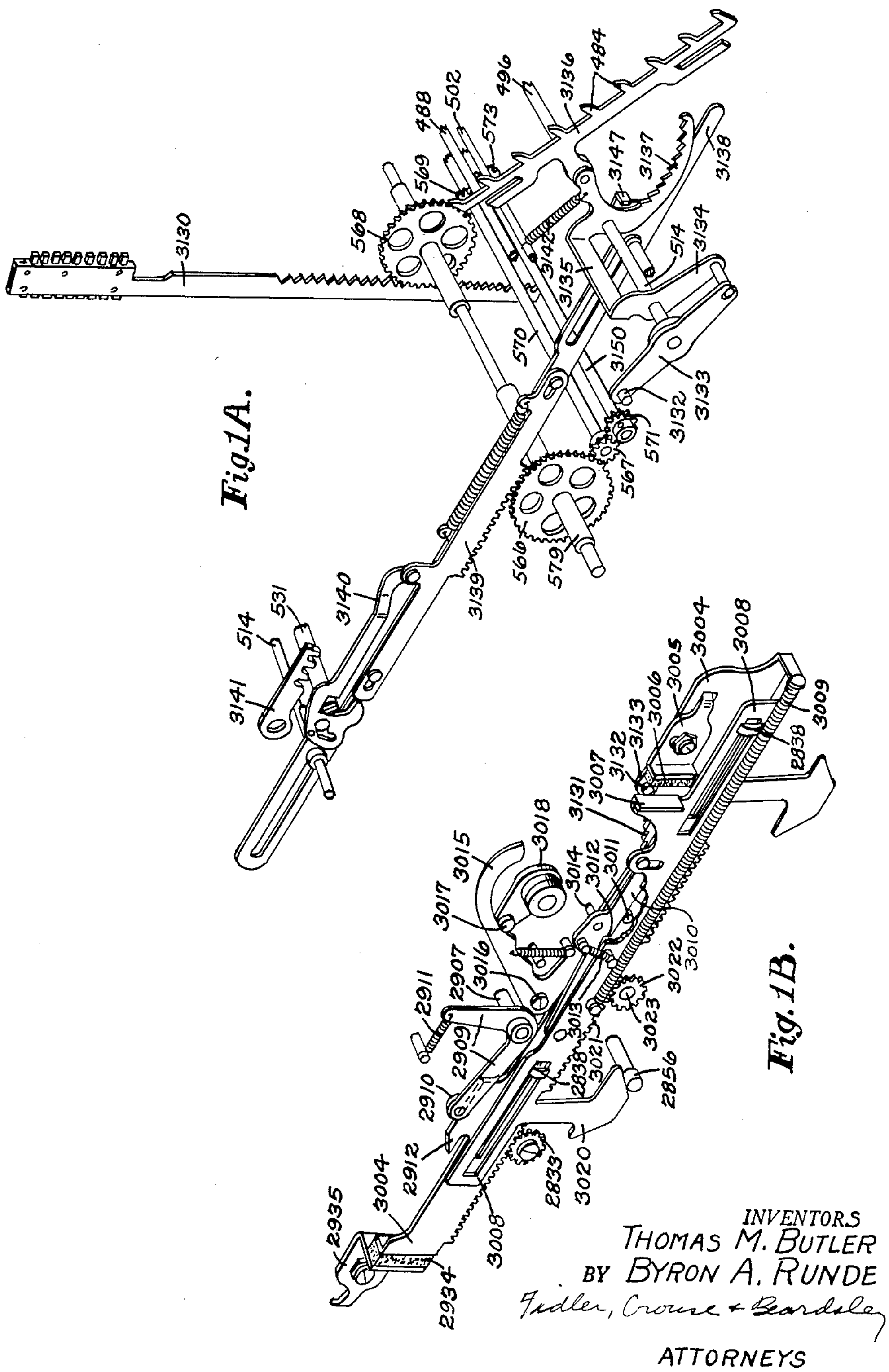
Fig. 1A is a perspective of register designating type indexing elements of Fig. 1.
Fig. 1B is a perspective of certain of the selected register indexing elements of Fig. 1.
Figure 2:
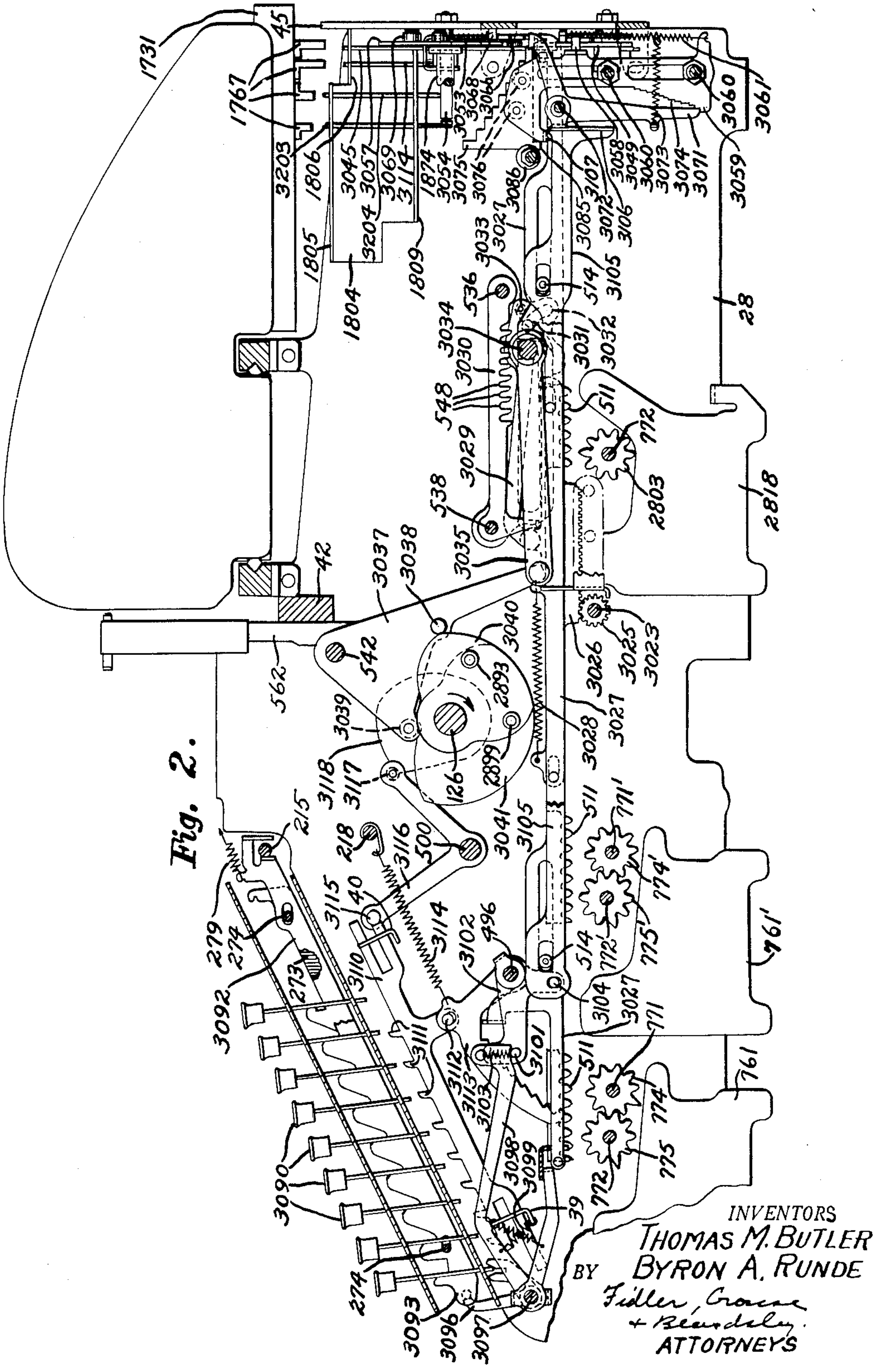
Fig. 2 is a fore and aft vertical section as viewed from the right side of the machine and just inside the right hand frame side plate and with many elements of the machine omitted to more clearly reveal portions of the invention.

The type indexing rack slide 3139 is geared to the register identifying type bar through a gear train which has been added to the type indexing gear cluster assembly as shown in Figs. 1 and 17. This added gear train includes large gear 566 meshing with the rack slide 3139 and with a pinion 567 which is freely rotatable on one shaft of the inner row of shafts 570 and in turn meshes with a pinion 571 fixed on a hub pinned on a shaft 3150 added in the place formerly occupied by the shaft 572 of the gear train for the 16th order. The shaft 3150 also has the hub of a pinion 573 pinned thereon, and the latter pinion meshes with a pinion 569 which is freely rotatable on another of the shafts 570. The latter pinion 569 meshes with a gear 568 which in turn meshes with the rack teeth on the rear edge of the lower portion of the type bar 3130. Thus, in each machine operation, the type bar 3130 is indexed in accordance with the register selected for that machine cycle prior to the operation of the printing hammers 605.

From Fig. 17, it may be noted that in the gear cluster of the present machine, in addition to the shaft 572 being shifted to another position, elements of others of the gear trains have been shifted to new positions. However, the thus rearranged unit still includes all of the gear trains required to couple each of the type bars 562 to the appropriate rack slide 523 or symbol indexing rack slide 588 or 589 as in the machine of the Butler application. It will be apparent that elements of the various gear trains included in the gear cluster assembly can be arranged in many satisfactory ways.

The machine case (not shown) and the keyboard have been widened rightwardly to accommodate an added row of function control keys 3155, 3156, 3157, 3158 and 3159 and mechanism for manual selection and control of the calculating functions to be performed by the selected register. The keys 321, 322, 323, 324 and 326 and the mechanism controlled thereby for controlling the functions of the front or "A" crossfooter, and the keys 315, 316, 317, 318 and 320 mechanism controlled thereby for controlling the functions of the rear or "B" crossfooter are as disclosed in the Butler application. The added keys and mechanism for controlling the functions of the selected register are generally similar in form and operation to those for the crossfooters except that direct negative total-taking and subtotal-taking operations cannot be performed on the registers. The stud 912 (Fig. 20) in the crank arm 911 secured on the main operating shaft 800 of the multiple register unit, like that for the front crossfooter, pivotally supports a connecting link 913 normally held by a tension spring 914 in the counterclockwise position of Fig. 20 with its notched lower arm coupled with an added stud 916 secured in the add slide 444 and its upper notched arm normally above and disengaged from an added stud 923 in the subtract and total slide 924. The stud 912 of the register unit, like that of the front crossfooter, also pivotally supports a connecting link 1008 which a spring 1009 normally holds in the counterclockwise position with its notched arm normally above and uncoupled from an added stud 1010 secured in the subtotal slide 1011. A number of the studs and shafts which, rightwardly of the right hand frame side plate 27, support elements of the function control means for the two crossfooters, have been extended rightwardly to support corresponding elements of the function control means for the registers in the present machine.

The multiple register total key 3155, subtotal key 3156, non-add key 3157, subtract key 3158 and add key 3159 are mounted in the keyboard in the same manner as the corresponding crossfooter function control keys, 315, 316, 317, 318 and 320 or 321, 322, 323, 324 and 326, and are provided with a strip 273, and interlock plates 347 (and 348), and with a key-latching slide 3160 which is like the key-latching slides 329 and 330 for the crossfooter control keys except that, as the register function control key row has no key in the location corresponding to the location of the "Repeat" and "Error" keys 319 and 325 in the crossfooter control key rows, the latch slide 3160 has no special formation or provisions at such location. The rearward portion of the key latch slide 3160 has the same formations and provisions for cooperation with the extended control rod 215 as do the key latch slides 329 and 330.

An interlock bar 3161 replaces the generally similar interlock bar (344) of the Butler application and is similarly located between the stems of the two rows of function control keys for the two crossfooters. Another generally similar interlock bar 3162 is located between the key stems of the rear crossfooter control key row and the register function control key row. The total keys 315 and 321 and subtotal keys 316 and 322 cooperate with the interlock bar 3161 in the same manner as they cooperated with the previous interlock bar (344) to prevent a total or subtotal key for either crossfooter from being depressed while a total or subtotal key for the other crossfooter is in depressed position. To cooperate in the same manner with the added interlock bar 3162, the left edges of the register total and subtotal keys 3155 and 3156 are formed like the left edges of the rear crossfooter total and subtotal keys 315 and 316, and the rightward edges of the latter keys are now formed like the rightward edges of the front crossfooter total and subtotal keys 321 and 322. The only difference between the interlock bar (344) of the Butler application and the interlock bars 3161 and 3162 is that the latter are formed at their rearward ends with projections 3163 and 3164, respectively, which extend toward each other sufficiently to engage each other when both interlock bars 3161 and 3162 are centered. If the total key or subtotal key in any of the three function control key rows is depressed, both interlock bars 3161 and 3162 will be positioned, either directly by depression of key 315 or key 316, or one interlock bar by the other if one of the keys 321, 322, 3155 and 3156 is depressed, so as to prevent depression of a total key or subtotal key in any other of the three function control key rows.

When the register non-add key 3157 is depressed, the lower end of its stem engages and depresses the forward arm of a bell crank 3165 (Fig. 20) which is mounted on the stud 377 and is yieldingly urged by a tension spring 3166 connected between the yoke of an interlock member 3225 referred to hereinafter and a stud in the downward arm of said bell crank. The lower end of the downward arm of the bell crank 3165 carries another stud projecting through an aperture in a link 3167, the rearward end of which is pivotally connected with an upward arm on the right side of a yoke member 3168 mounted on a stud 3169 secured in and projecting rightwardly from the frame plate 27. Depression of the non-add key 3157 rocks the yoke member 3168, through the bell crank 3165 and link 3167, to such extent that a rearward arm 3170 on the left side of the yoke 3168 bearing on the upper arm of the coupling link 913 rocks the latter clockwise sufficiently to uncouple the lower arm of the link 913 from the stud 916 in the add slide 444 but insufficiently to couple the upper arm of the link 913 with the stud 923 in the subtract and total slide 924. Thus, the register pinion frame will not be elevated to mesh the pinions of any of the registers with the amount actuator racks (511) in a machine cycle in which the register non-add key 3157 is in depressed position.

When the register subtraction key 3158 is depressed, the lower end of its stem engages the forward end of the forward arm of the bell crank 3165 and rocks the latter and, through the link 3167, also the yoke 3168 far enough not only to uncouple the lower arm of the coupling link 913 from the stud 916 in the add slide 444 but also to couple the upper arm of the link 913 to the stud 923 in the slide 924. Thus, during a machine cycle in which the register subtraction key 3158 is in depressed position, subtraction will be performed on the selected register.

When the register subtraction key 3158 is depressed the leftward portion of the lower end of its stem also engages and depresses the end of the rightwardly turned lug 397 of a second bell crank 398 which has been mounted on the stud 377 between the bell crank 3165 and the bell crank 931. The added bell crank 398 is like the bell crank 398 on the stud 377 leftward of the bell crank 931 but its rear downward arm is rightward of the right end of the machine cycling stud 378 and its downward cam projection 739 is rightward of the right end of the bi-color ribbon control stud 738. However, the lug 397 of the added bell crank 398 overlies the rearward end of one leg of a U-shaped piece 3171 the rearward end of the other leg of which has been secured to the lug 397 of the previously provided left yoke member 398 so that the latter will also be rocked to initiate a machine cycle and place the bi-color ribbon control mechanism in red ribbon condition when the register subtraction key 3158 is depressed.

When the register total key 3155 is depressed, the lower end of its stem engages and depresses the forward arm of a lever 3172 mounted on the extended rightward end of the shaft 218. A downward arm of the lever 3172 carries a stud extending through a forwardly and rearwardly elongated slot in the link 3167 and piovtally connected to the forward end of a link 3173, the rearward end of which is pivotally connected to an upward arm on the rightward side of a yoke member 3174 mounted on the stud 3169. The yoke member 3174 also has a downward right side arm 3175 normally engaging the rear side of a stud 3176 secured in and projecting leftwardly from a downward arm on the rightward side of a yoke member 3177 mounted on the stud 3169 and urged counterclockwise by a tension spring 3178. The arm 3175 also carries a stud 3179 projecting leftwardly immediately behind a downward right side arm 3180 of the yoke member 3168.

Depression of the register total key 3155 rocks the yoke member 3168 far enough to uncouple the lower arm of the link 913 from the stud 916 in the slide 444 and couple the upper arm of the link 913 with the stud 923 in the slide 924, and rocks the yoke member 3177 to place the lower end of a downward left side arm 3181 of the yoke member 3177 over the stud 814 which controls the zero stop bail 803 of the multiple register unit, and to pull rearwardly the link 948 which has been provided with a rearward extension having a forwardly and rearwardly elongated slot embracing, normally in its rearward end, a stud 3182 secured in an upward left side arm of the yoke member 3177. Such rearward movement of the link 948 moves the link 951 to effective position to cause the differential stop slides (483) and stop sectors (491) for the amount key rows to be held in their normal positions and to effect release of the 12th order actuator rack (519) in the ensuing machine cycle. The lever 3172 also has an arm 3183 extending downwardly immediately in front of the stud 382 so that depression of the register total key 3151 also initiates a machine cycle. Thus, in a machine cycle initiated by depression of the total key 3155, a total will be taken from the selected register.

When the register subtotal key 3156 is depressed, the lower end of its stem engages and depresses the forward arm of a lever 3184 mounted on the shaft 218, and urged clockwise by a tension spring 3185 connected between the stud 377 and a downward arm of the lever 3184. The latter arm is pivotally connected to the forward end of a link 3186 which is pivotally connected at its rearward end to an upward right side arm of a yoke member 3187 mounted on the stud 3169. The yoke member 3187 has a right side arm 3188 normally engaged against the rear side of the stud 3176 and a rearward left side arm 3189 bearing against the upper edge of the coupling link 1008. The lever 3184 also has an arm 3190 extending downward immediately in front of the stud 382. Thus, depression of the register subtotal key initiates a machine cycle, rocks the yoke member 3187 to couple the link 1008 with the stud 1010 in the subtotal slide 1011, and rocks the yoke member 3177 to render the zero stop bail 803 for the register pinions effective and cause the amount differential stop slides (483) to be held in normal position and release the 12th order actuator rack (519). When the coupling link 1008 is thus rocked to couple it with the stud 1010, it also acts on a lug 3191 extending rightwardly from the coupling link 913 and rocks the latter to its non-add position.

When the register add key 3159 is depressed, the lower end of its stem engages and depresses the forward arm of a lever 3192 mounted on the stud 386. By such rocking of the lever 3192, a rightwardly projecting lug 3193 on the rear end thereof is placed behind a shoulder 3194 on the forward portion of the link 3167 and blocks rearward movement thereof. Depression of the register add key 3159, by thus blocking rearward movement of the link 3167, prevents the active register from being automatically conditioned, by the automatic function control mechanism described hereinafter, for total-taking, non-addition or subtraction.

In the carriage governed automatic control mechanism of the present machine, means similar to those in lane 7 are provided in lane 17 for automatically placing the register function controls in non-add or in subtraction condition.

A cam disk 3195 (Fig. 21) secured in the lane 17 position on the automatic function control cam shaft 1874 is of the same configuration as the lane 7 cam disk 1899 on said shaft. The edge of the cam disk 3195 is engaged by a roller 1913 carried by a control lever 3196 (Fig. 22) which is coupled at its left end with a sensing pin 3203 mounted in the lane 17 position in the row of sensing pins of the machine of the Butler application. The lane 17 sensing pin 3203 and control lever 3196 are like the lane 13 sensing pin (1821) and control lever (1841) except that the lane 17 control lever 3196 extends further rightwardly beyond the guide plate 1554 to engage under the end of a rearward left side arm 3197 of a yoke member 3198 mounted on the stud 1870 with its left side between the lane 16 and lane 18 bell cranks and its rightward side rightward of a lane 23 bell crank referred to hereinafter. A downward arm 3199 on the rightward side of the yoke 3198 carries a stud 3200 projecting through a forwardly and rearwardly elongated slot in the rear end of a link 3201 which, at its forward end, is pivotally connected to the upward right side arm of the yoke member 3168 (Fig. 20). A tension spring 3202 connected at its rearward end to the arm 3199 and at its forward end to a downward projection of the link 3201 normally maintains the stud 3200 in the forward end of the slot in the link 3201 and aids the springs 3166 and 914 in urging the yoke member 3198, links 3201 and 3167, yoke 3168 and bell crank 3165 to normal position.

The above described lane 17 automatic control means operates the register function controls in the same manner as the lane 7 and lane 11 automatic control means operate the front and rear crossfooter function controls. In a machine cycle in which the lane 17 sensing pin 3203 encounters a #9 control projection 1767 (of a length intermediate the lengths of the #7 and #8 control projections of Fig. 14) above it in lane 17, the rightward end of the lane 17 control lever 3196 is elevated, the yoke member is rocked counterclockwise and the link 3201 is pulled rearwardly only far enough to rock the yoke 3168 and connecting pawl 913 to the non-add position where the pawl 913 is disconnected from the stud 916 but not connected to the stud 923. In a machine cycle in which the lane 17 sensing pin 3203 encounters a #5 projection 1767 in lane 17 above it, the rightward end of the lane 17 control lever 3196 is elevated far enough to couple the upper arm of the link 913 to the stud 923 in the slide 924 so that subtraction will be performed on the pinions of the selected register.

A cam disk 3205 (Fig. 21) secured in the lane 20 position on the shaft 1874 and having the configuration of the lane 6 cam disk 1898, cooperates with a roller 1913 carried by a control lever 3206 (Fig. 22) having its leftward end coupled with a sensing pin 3204 in the lane 20 position in the sensing pin row. The lane 20 sensing pin 3204 and control lever 3206 are like the lane 16 sensing pin and control lever (1844) except that the rightward end of the control lever 3206 extends farther rightwardly beyond the guide plate 1554 and engages under the end of a rearward left side arm 3207 of a yoke member 3208. The yoke member 3208 is mounted on the stud 1870 with its leftward side in the lane 20 position thereon and with its rightward side rightward of the right side of the lane 17 yoke 3198. The yoke 3208 has a downward left side arm formed with a latch projection 1924 to cooperate with the latching bail 1928, and has also a downward right side arm 3209 carrying a stud 3210 projecting through a forwardly and rearwardly elongated slot in the rear end of a link 3211. The forward end of the link 3211 (Fig. 20) is pivotally connected to the rearward end of the link 3173 and upward right side arm of the yoke 3174. A tension spring 3212 connected between the arm 3209 and a downward projection of the link 3211 normally yieldingly maintains the stud 3210 in the forward end of the slot in the link 3211 and urges the yoke member 3208 clockwise, the links 3211 and 3173 forwardly, the yoke 3174 counterclockwise and the lever 3172 clockwise to their normal positions.

The lane 20 automatic control means described above operates the register function control means in the same manner as the lane 6 and lane 10 automatic control means operate the front and rear crossfooter function control means. In a machine cycle in which the lane 20 sensing pin 3204 encounters a #5 control projection 1767 above it in lane 20, the rightward end of the control lever 3206 is elevated and rocks the yoke member 3208 far enough to cause its latch point 1924 to become latched by the latch bail 1928 and to pull the link 3173 rearwardly to the same extent as it is moved rearwardly when the register total key 3155 is depressed, so that a total will be taken from the pinions of the selected register.

A cam 3215 (Fig. 21) secured in the lane 23 position on the shaft 1874 and having the configuration of the lane 8 cam 1900, cooperates with a roller 1913 carried by a control lever 3216 (Fig. 22) having its leftward end coupled with a sensing pin 3114 in the lane 23 position in the sensing pin row. The lane 23 sensing pin 3114 is like the lane 22 sensing pin (1827) and the control lever 3216 is like the lane 16 control lever (1844) and lane 20 control lever 3206 except that it extends still farther rightward beyond the guide plate 1554 to engage its rightward end under the end of the rearward arm of a bell crank 3217 mounted in the lane 23 position on the stud 1870. The lane 23 control lever 3216 crosses above the stud 1852 which guides the lane 22 control lever (1847) and its leftward end portion is guided on the rod 1851, the rod 1851 having been lengthened rearwardly a little beyond the upper portion of the bracket 1850.

The downward arm of the bell crank 3217 carries a stud 3218 projecting through a forwardly and rearwardly elongated slot in the rearward end of a link 3219 which, at its forward end, is pivotally connected to the upward right side arm of the yoke member 3187 (Fig. 20). A tension spring 3220 connected between the downward arm of the bell crank 3217 and a downward projection of the link 3219 normally maintains the stud 3218 in the forward end of the slot in the link 3219 and aids the springs 3185 and 1009 in urging the register subtotal-taking control elements described above toward their normal positions.

In a machine cycle in which the lane 23 sensing pin encounters a #5 control projection above it in lane 23, the rightward end of the control lever 3216 is elevated, rocks the bell crank 3217 counterclockwise, pulls the links 3219 and 3186 rearwardly, and rocks the yoke member 3187 clockwise and lever 3184 counterclockwise to the same extent as when the register subtotal key 3156 is depressed, whereby the register function controls are placed in subtotal-taking condition as previously described.

An interlock member 3225 (Fig. 20) like the previously provided interlock members (2155 and 2158) for the front and rear crossfooter function controls is pivotally mounted on the stud 254 rightwardly of the last-mentioned interlock member (2158). It serves, in relation to the multiple register function controls, the same purposes which the corresponding previously provided interlock members (2155 and 2158) serve in relation to the front and rear crossfooter function controls. The member 3225 is urged counterclockwise by the spring 3166 and has three upward arms 3226, 3227 and 3228, the middle one, 3227, of which is normally engaged against the rear side of a stud 3229 projecting leftwardly from an intermediate portion of the forward arm of the bell crank 3165 and has a cam edge under the stem of the register non-add key 3157. The rear arm 3228 has a cam edge normally engaged against the lower rear side of a stud 3230 projecting leftwardly from the forward end portion of the forward arm of the lever 3184.

Upon depression of either the register total key 3155 or the register subtract key 3158, the stud 3229 is depressed into the slot in the member 3225 between its front and middle arms 3226 and 3227 thereby locking the member 3225 in normal position and, through the arm 3228, stud 3230, lever 3184 and link 3186, preventing the lane 23 link 3219 from being moved rearwardly to condition the register function controls for subtotal taking.

When the register subtotal key 3156 is depressed, the lever 3184 is rocked as previously described and the stud 3230 cams the member 3225 clockwise to place the upper end of its forward arm under the stud 3229 so that, through the bell crank 3165, link 3167, yoke 3168, stud 3179 and yoke 3174, the lanes 17 and 20 links 3201 and 3211 are prevented from being moved rearwardly far enough to condition the register function controls for subtraction or total-taking.

When the register non-add 3157 is depressed, its stem acts on the arm 3227 to cam the member 3225 clockwise to place the upper end of the arm 3226 under the stud 3229, so that through the bell crank 3165, the link 3167, yoke 3168, stud 3179 and yoke 3174, the lanes 17 and 20 links 3201 and 3211 are prevented from being moved rearwardly far enough to place the register function controls in subtraction or total-taking condition.

It will be apparent that manual selection of total-taking or subtotal-taking for the register will prevent automatic selection of any other function for the register, that manual selection of subtraction will prevent automatic selection of subtotal-taking or non-addition, that manual selection of non-addition will prevent automatic selection of total-taking or subtraction and that manual selection of addition will prevent automatic selection of total-taking, subtraction or non-addition, but automatic selection of total-taking will prevail over manual selection of subtraction and automatic selection of subtotal-taking will prevail over manual selection of addition or non-addition.

Another type bar 3235 (Fig. 23), provided with the same arrangement of function-symbol types as are provided on the front and rear crossfooter function symbol type bars, is positioned between the register number designation type bar 3130 and the rear crossfooter function symbol type bar. The type bar 3235 is indexed by means essentially like those which index the crossfooter function symbol type bars except that there are no provisions for taking direct true negative totals and subtotals from the registers and no provisions for indexing the register symbol type bar 3235 to the negative total and negative subtotal symbol printing positions. An added rack slide 3236 (Fig. 20), essentially like the rack slides 588 and 589 is slidably mounted on the studs 446 and 447 and is urged forwardly by a tension spring 3237 which normally yieldingly maintains a downward projection 3238 engaged against the rearward side of a rightward extension of the drive stud 596. The slide 3236 has on its upper edge, a rightwardly turned lug 3239 which is arrested by the upper rearmost shoulder on a stop arm 3241 on the yoke 3168 as the slide 3236 moves forward in a machine cycle in which subtraction is performed on the selected register but limits on a lower, more forward shoulder on the stop arm 3241 in a machine cycle in which the register controls are in non-add condition. The projection 3239 is arrested by a stop arm 3242 on the yoke 3174 in a machine cycle in which the register function controls are in total-taking condition, and is arrested by a stop arm 3142 on the yoke 3187 in a machine cycle in which the register controls are in subtotal-taking condition. In a machine cycle in which the register function controls are in add condition, the slide 3236 is permited to move to its farthest forward position.

A rack 3245 on the lower edge of the slide 3236 meshes with a gear 3246 rotatable on the stud 587. The gear 3246 also meshes with a pinion 3247 freely rotatable on the shaft 570 to which the forward one of the pinions 585 is secured, and the pinion 3247 in turn meshes with a pinion 3248 pinned on the outer end of a shaft 3249 which has been added in the outer row of shafts in the gear cluster assembly (see also Fig. 17). A pinion 3250 pinned on the inner end of the shaft 3249 meshes with a pinion 3251 which is freely rotatable on the same shaft 570 to which forward one of the two pinions 585 is secured. The pinion 3251 in turn meshes with a gear 568 which in turn meshes with rack teeth on the forward edge of the register function symbol printing type bar 3235.

The forward movements permitted the rack slide 3236 in machine cycles in which the register function controls are conditioned for performance of the various register functions are such as to cause the rack slide 3236, through the gear train just described, to elevate the type bar 3235 to position the appropriate symbol type at the printing line.

Two additional printing hammers 605 (one shown in Fig. 1) have been provided for the added type bars 3130 and 3235, and hammer operating and control parts (not shown) corresponding to those previously provided for the front and rear crossfooter symbol type bars are also provided. The added control parts include variable printing control parts (controlled by the lane 22 automatic control means) and two added latch members 622 like those provided for the other type bars rightward of the lowest order amount printing type bar.

The register function symbol printing type bar 3235 is provided with two studs 638, like those of the crossfooter function symbol type bars, to cooperate with an added cam member 634 pivotally mounted on the shaft 636 and notched to embrace the lengthened stud 637.

It will be apparent that, apart from variations produced by the variable printing control means, the number of the selected register and the symbol corresponding to the function performed on the selected register together with symbols corresponding to the function performed on the two crossfooters will be printed each time an amount is printed and each time a total-taking or subtotal-taking operation is performed on either crossfooter or on a register.

The timing of the register selecting and restoring mechanism is shown in the second to sixth graph lines, inclusive of Fig. 24. It will be noted that the timing shown by the last four graph lines of Fig. 24 differs from the timing of the corresponding parts in the Runde application because the position of the stud 2899 has been advanced about 10° clockwise relative to its position in the machine of the Runde application. The timing of other elements of the machine not represented in Fig. 24 has also been changed a little from that shown in the Butler application to increase slightly the time available for effecting movement of the selected register to active position. All but three (2117, 236 and 200) of the cams and cranks on the main shaft 126 of the machine of the Butler application have been shifted about 7° counterclockwise about the shaft 126 relative to the position of the clutch tooth (135) of the clutch pawl 134. That has produced a delay of about 7° in all the timing of all of the parts represented in the timing charts of the Butler application excepting that the timing of the shaft 218 and the timing of the automatic control cam shaft 1874 and the cams and cranks on the latter have not been changed and except also that the partial restoration (prior to the 180° point) of the cycle trip lever (194) which acts on the lever 145 also has not been changed from the timing shown in the Butler application.

In the present machine, means is provided also to insure that the shaft 126 will not back up after uncoupling of the cycling clutch 129, 134 at the end of a machine cycle. An arm 3260 is swingably mounted at its forward end on a stud 3261 secured in the rearward portion of the leftward one of the brace members 49. A tension spring 3262 urges the arm 3260 clockwise so that a roller 3263 on a stud secured in the rearward end of the arm 3260 bears on the spiral edge of a disk 3266 secured to a hub pinned on the shaft 126. At the completion of each machine cycle, the roller 3263 drops down in front of a radial shoulder 3265 on the disk 3266 so as to prevent any retrograde rotation of the shaft 126.

The machine disclosed herein is also provided with the automatic red-ribbon repeat control mechanism disclosed in another application of Byron A. Runde, Serial No. 182,041, filed April 29, 1950, wherein the red ribbon control stud 738 shown in Fig. 20 is carried by a lever 2720 which replaces the red ribbon control lever (737) which carries the red ribbon control stud 738 in the machine of the Butler application.

We claim:

1. In a calculating machine having means to drive it through cycles of operation, a frame, a carriage mounted on said frame for movement to each of a plurality of positions relative thereto, a multiplicity of registers, and a register selecting mechanism including a member mounted for reciprocation between one and any other of a series of positions, means driven by said drive means in each cycle of operation of the machine to reciprocate said member through said series of positions to and from said one position, means operable by said member upon movement thereof to its several positions to condition respective ones of said registers for operation, register-selecting manipulative means, a normally ineffective first stop means conditionable by said manipulative means to block reciprocation of said member by said driven means beyond selected ones of said positions, means controlled by said carriage in accordance with the positions thereof, a second stop means conditionable by said carriage-controlled means to block reciprocation of said member by said driven means beyond selected ones of said positions, and means conditioned by register selecting manipulation of said manipulative means to disable said second stop means from arresting said member.

2. In a calculating machine having means to drive it through cycles of operation, a frame, a traveling carriage mounted on said frame for movement to each of a plurality of positions relative thereto, a multiplicity of registers, and a register selecting mechanism including a slide mounted for reciprocation between a normal position and each of a multiplicity of other positions, means operable by said slide upon movement of said slide to its several positions to condition respective ones of said registers for operation, a member driven by said drive means in a cycle of operation of the machine from and to a normal position through a stroke having an invariable amplitude at least as great as the maximum reciprocation of said slide, means connecting said slide with said drive means for reciprocation of said slide from and to its normal position by said reciprocating member, said connecting means being of a kind permitting arrest of said slide in any of said slide positions and subsequent return of said slide to normal position by said reciprocating member while said reciprocating member travels through its invariable reciprocation, manipulative register selecting means, stop means controlled by said manipulative means to arrest said slide in the several ones of said slide positions, control means governed by said carriage in accordance with the positions of said carriage, stop means conditionable by said carriage-governed control means to arrest said slide in the several ones of said slide positions, and means controlled by said manipulative means to prevent said last-mentioned stop means from being conditioned by said carriage controlled means to arrest said slide.

3. In a calculating machine having means to drive it through cycles of operation, a multiplicity of registers, and register selecting means including a first member movable rapidly by said drive means toward an extreme position in one direction early in a machine cycle and restored to a normal position at a later time in said machine cycle, means to arrest said member in any of a series of positions short of said extreme position and corresponding to respective registers, a second member movable from a normal position by said first member, means to retain said second member in moved position until a time subsequent to the restoration of said first member to normal position, a latch member connected with one of said members and engageable with a portion of the other of said members to prevent overthrow of said second member relative to said first member upon termination of said rapid movement of said first member from normal position, and means independently of said first and second members driven positively by said drive means and acting positively on said latch member to move the latter to non-latching position after termination of said movement of said members from normal position and prior to restoration of said first member to normal position.

4. In a recording calculating machine having means to drive it through cycles of operation, a stationary frame, a movable frame mounted on said stationary frame for movement to any of a plurality of columnar recording positions relative to the latter, means driven by said drive means to move said movable frame from one to another of said positions during a portion of a machine cycle subsequent to a predetermined point in said cycle, a multiplicity of registers in one of said frames, and register selecting mechanism comprising a first member mounted in said one frame for movement between a normal position and a fully moved position, means powered by said drive means to move said first member rapidly toward said fully moved position and to return it to said normal position in a portion of said cycle prior to said predetermined point, register selecting stop elements positioned on the other of said frames to be selectively positioned to limit the movement of said first member in accordance with the columnar positions of said movable frame to variably limit the movement of said first member away from its normal position when said movable frame is in different ones of said columnar positions, a second member movably mounted in said one frame and engaged by said first member for movement thereby from a normal position, means to detain said second member in moved position, means to release said second member from said detaining means for return to its normal position subsequently to said predetermined point in said cycle, an element movably mounted on one of said movable members and normally engaging the other of said members to prevent overthrow of said second member as movement of said first member from its normal position is limited, and means operated by said drive means to disengage said element from said other member after movement of said first member has been limited and prior to return movement of said first member toward normal.

5. A calculating machine having means to drive it through cycles of operation, a unitarily movable multiple register pinion assembly, a first member movable from a normal position to register selection positions and operatively connected with said pinion assembly to move the latter from a normal position to corresponding register selection positions, means to detain said pinion assembly and first member in any register selection position, means operated from said drive means to disable said detaining means at a late predetermined time relative to a machine cycle, a second member, driving connections between said drive means and said second member whereby the latter is moved in a machine cycle from a normal position to register selection positions and again to normal position prior to disablement of said detaining means, register selecting means to limit movement of said second member from normal position, said second member having means to engage said first member to move the latter from normal position to register selection positions, a coupling device movably mounted on one of said first and second members, means to engage said coupling member with the other of said first and second members prior to limitation of the movement of said first member from normal position to prevent rebound and overthrow of said first member and said pinion assembly, and means operable from said drive means to disengage said coupling device subsequent to such limitation of movement of said second member and prior to the return of the latter to normal position.

6. A machine according to claim 5, wherein said drive connections between said drive means and said second member include a differential actuator means which is controlled by said register selecting means and is of a kind imparting to said second member movements exceeding to a constant extent movements required to displace said first member from its normal position to its several register selection positions, said first-member-engaging means of said second member being arranged to engage and move said first member only after movement of said second member from its normal position to an extent equal to said constant excess, and said coupling device being arranged to couple said first and second members upon movement of said second member from its normal position to the extent of said constant excess.

7. In a calculating machine having means to drive it through cycles of operation, a frame, a carriage mounted on said frame for movement to each of a plurality of positions relative thereto, a multiplicity of registers, and a register selecting mechanism including a member mounted for reciprocation between one and any other of a series of positions, means driven by said drive means in each cycle of operation of the machine to reciprocate said member, means operable by said member upon movement thereof to its several positions to condition respective ones of said registers for operation, manipulative means, a first stop means variably conditionable by said manipulative means to arrest said member in various ones of its register conditioning positions, a second stop means indexable from a normal ineffective position to any of a series of effective positions to arrest said member in various ones of its register selecting positions, means operable by said drive means in each cycle of operation of the machine and controlled by said carriage in accordance with the positions thereof to index said second stop means from its normal position to any of said effective positions, and means operable by said manipulative means upon manipulation thereof to prevent indexing of said second stop means from its normal ineffective position by said carriage controlled means in a following machine cycle.

8. In a calculating machine having means to drive it through cycles of operation, a frame, a carriage mounted on said frame for movement to each of a plurality of positions relative thereto, a multiplicity of registers, and a register selecting mechanism including a member mounted for reciprocation between one and any other of a series of positions, means driven by said drive means in each cycle of operation of the machine to reciprocate said member, means operable by said member upon movement thereof to its several positions to condition respective ones of said registers for operation, manipulative means, first and second normally ineffective stop means variably conditionable to arrest said member in various ones of its register conditioning positions, means operable by said drive means in the initial portion of the machine cycle and controlled by said carriage in accordance with the positions thereof to effectively condition said first stop means to arrest said member in selected ones of its register conditioning positions in accordance with the positions of said carriage, means operable by said drive means in the initial portion of the machine cycle and controlled by said manipulative means to effectively condition said second stop means to arrest said member in any of a plurality of its register conditioning positions, and means operable by said manipulative means upon register selecting manipulation thereof prior to the machine cycle to prevent effective conditioning of said first stop means in the machine cycle.

9. In a calculating machine having means to drive it through cycles of operation, a unitarily movable multiple register assembly, and register selecting means including a first light weight member movable rapidly by said drive means toward an extreme position in one direction early in a machine cycle and restored to a normal position at a later time in said machine cycle, means to arrest said member in any of a series of positions short of said extreme position and corresponding to respective registers, a light weight register selecting stop member movable from a normal position by said first member, means to retain said stop member in moved position until a time subsequent to the restoration of said first member to normal position, a latch member connected with one of said members and engageable with a portion of the other of said members to prevent overthrow of said stop member relative to said first member upon termination of said rapid movement of said first member from normal position, means independent of said members driven positively by said drive means and acting positively on said latch member to move the latter to non-latching position after termination of said movement of said members from normal position and prior to restoration of said first member to normal position, and means operated by said drive means after arrest of said light weight stop member in register selecting position and controlled by the latter in accordance with its position to move the multiple register assembly to place the selected register in operative position.

10. A calculating machine having means to drive it through cycles of operation, a multiplicity of registers, a first means driven rapidly by said drive means in an initial portion of each machine cycle, a first differential actuator means operated by said first driven means, register selecting means to variably limit operation of said differential actuator means by said first driven means, means actuated by said first differential actuator means to condition selected registers for operation, a second means independent of said first driven means and driven by said drive means in each machine cycle subsequently to said conditioning of the selected register, a second differential actuator means operated by said second driven means, means conditioned by said first differential actuator means to subsequently limit operation of said second differential means by said second driven means, an indexable register-designation type carrier, and means actuated by said second differential actuator means to index said type carrier.

11. A calculating machine having means to drive it through cycles of operation, settable amount entering means, amount differential actuator mechanism controlled by said settable amount entering means, a multiplicity of registers, a first means driven rapidly by said drive means in an initial portion of each machine cycle, a register-selection differential actuator means operated by said first driven means, register selecting means to variably limit operation of said register-selection differential actuator means by said first driven means, means actuated by said register-selection differential actuator means to condition selected registers for cooperation with said amount differential actuator mechanism, a second means independent of said first driven means and driven at lower speed by said drive means in each machine cycle subsequently to said conditioning of the selected register to operate said amount differential actuator mechanism, printing mechanism including indexable amount type carriers and an indexable register-designation type carrier, a register-designation differential actuator means also operated by said second driven means, means actuated by said register-designation differential actuator means to index said register-designation type carrier, and means conditioned by said register-selection differential actuator means to control operation of said register-designation differential actuator means and thereby the indexing of said register-designation type carrier.

References Cited in the file of this patent

UNITED STATES PATENTS

| | | |
|---|---|---|
| 1,394,256 | Fuller | Oct. 18, 1921 |
| 1,909,715 | Pasinski | May 16, 1933 |
| 1,931,113 | Muller | Oct. 17, 1933 |
| 2,165,340 | Butler | July 11, 1939 |
| 2,625,323 | Nelson | Jan. 13, 1953 |

FOREIGN PATENTS

| | | |
|---|---|---|
| 473,624 | Great Britain | Oct. 18, 1937 |